(12) United States Patent
Matsufuji

(10) Patent No.: US 6,553,759 B2
(45) Date of Patent: Apr. 29, 2003

(54) TRANSMISSION FOR A WORKING VEHICLE

(75) Inventor: Mizuya Matsufuji, Hyogo (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/861,527

(22) Filed: May 22, 2001

(65) Prior Publication Data

US 2001/0023587 A1 Sep. 27, 2001

Related U.S. Application Data

(62) Division of application No. 09/080,458, filed on May 19, 1998, now Pat. No. 6,233,931, which is a division of application No. 08/791,580, filed on Jan. 31, 1997, now Pat. No. 5,913,950.

(30) Foreign Application Priority Data

Jan. 8, 1996 (JP) ................................. 8-1007
Jan. 31, 1996 (JP) ............................... 8-14832
Feb. 22, 1996 (JP) ............................... 8-34148

(51) Int. Cl.$^7$ ............................................. F16D 31/02
(52) U.S. Cl. ............................ 60/442; 60/435; 74/15.2
(58) Field of Search ......................... 74/11, 15.2, 15.6; 60/435, 442

(56) References Cited

U.S. PATENT DOCUMENTS

| 3,208,222 A | | 9/1965 | Wilmes |
| 3,995,510 A | | 12/1976 | Yost |
| 4,304,141 A | | 12/1981 | Tone et al. |
| 4,579,183 A | | 4/1986 | Irikura et al. ................. 74/156 |
| 4,614,133 A | * | 9/1986 | Nerstad et al. ............... 74/740 |
| 4,727,759 A | * | 3/1988 | Yamaoka et al. ............. 74/15.2 |
| 4,938,085 A | * | 7/1990 | Suzuki et al. ................. 74/15.2 |
| 4,955,249 A | | 9/1990 | Wetor |
| 4,974,472 A | | 12/1990 | Nishimura et al. |
| 5,046,994 A | | 9/1991 | Hasegawa et al. |
| 5,203,169 A | | 4/1993 | Ishii et al. |
| 5,231,891 A | | 8/1993 | Morita et al. |
| 5,239,827 A | | 8/1993 | Havens |
| 5,542,307 A | | 8/1996 | Hasegawa et al. |
| 5,544,547 A | | 8/1996 | Ishimaru |

FOREIGN PATENT DOCUMENTS

| JP | 62-5942 | 2/1987 |
| JP | 6-20867 | 3/1994 |

* cited by examiner

Primary Examiner—F. Daniel Lopez
(74) Attorney, Agent, or Firm—Sterne, Kessler, Goldstein & Fox P.L.L.C.

(57) ABSTRACT

The present invention is so designed that a housing of a transmission which can drive front wheels and rear wheels and a power take-off shaft is constructed having a first chamber and a second chamber. A hydrostatic transmission is housed in the first chamber. A gear-type speed changing unit is housed in the second chamber. A hydraulic pump and a hydraulic motor are separately disposed on the inner and outer surfaces of the front wall of the first chamber. A clutch mechanism for engaging or disengaging with or from the front wheels for supplying power thereto is also provided. On the housing is provided a restraint mechanism for restraining rearward acceleration more than a predetermined speed by a speed control lever of the hydrostatic transmission when the gear-type speed changing unit is switched to the high speed setting. Left and right running brake units provided on the vehicle are made independently operable by treading left and right turn brake pedals on a first brake pedal shaft and made simultaneously operable by treading a master brake pedal on a second brake pedal shaft.

2 Claims, 31 Drawing Sheets

TRANSMISSION FOR A WORKING VEHICLE

This is a divisional application of U.S. patent application Ser. No. 09/080,458; Filed: May 19, 1998 (now U.S. Pat. No. 6,233,931), which is a divisional application of U.S. patent application Ser. No. 08/791,580; Filed: Jan. 31, 1997 (now U.S. Pat. No. 5,913,950).

FIELD OF THE INVENTION

The present invention relates to a transmission for driving front and rear wheels of a running vehicle. More specifically, the invention relates to, a transmission in which is provided in a housing unit thereof: a hydrostatic transmission (hereinafter referred to as an HST), a front wheel driving construction, a restraint mechanism for rearward speed change, a power transmission system linking an input shaft of a power take-off shaft of the transmission with a power take-off clutch and a power take-off braking unit, and a brake operating construction which enables left and right braking units to provide oil to the vehicle independently with left and right turn brake pedals or simultaneously by a master brake pedal.

BACKGROUND OF THE INVENTION

A transmission equipped with an HST and for driving front wheels and rear wheels is well-known, as disclosed in, for example, U.S. Pat. No. 5,544,547. With this technique, an engine transmits power through an input shaft to drive a hydraulic pump of the HST. The input shaft transmits the power from the rear end of the hydraulic motor of the HST to a differential gear unit, which in turn drives a gear-type speed changing unit. This unit drives the rear and front wheels through a universal joint by a fore end of the output shaft forwardly projecting from a housing.

This technique is constructed so that both the hydraulic pump and hydraulic motor are housed in the housing and the front wheels are directly driven by the output shaft of the hydraulic motor of the HST. Thus, when the speed of the gear-type speed changing unit is changed, the speed ratio between the front wheels and the rear wheels is not synchronized. In order to avoid this occurrence, a restraint mechanism must be provided which restrains the front wheels from being driven when the gear-type speed changing unit is switched to the high speed setting.

The transmission provided with the HST and gear-type speed changing unit, when the latter is switched to the high speed operating position, cannot operate a speed change pedal of the HST to increase the speed of rearward movement more than a predetermined value. This is well-known in, for example, Japanese Utility Model Publication No. Sho 62-5942.

In such a conventional technique, the restraint mechanism for rearward movement speed change with respect to the speed changing unit of the HST is constructed in such a manner that in order to change the speed of the gear-type speed changing unit, a restraint ring is interposed outside of the housing and between the operating lever and the speed changing pedal situated outside the housing. Consequently, when dust or the like attaches to the link after long use, complete restraint may not be made, resulting in a lack of reliability.

Also, the aforesaid U.S. Pat. No. 5,544,547 discloses that in a housing of a running vehicle are housed the HST, a power take-off (hereinafter referred to as a PTO) clutch, and a PTO brake unit. In detail, the housing is partitioned into a front chamber and a rear chamber. The HST is housed in the front chamber. A PTO transmission for transmitting power from an input shaft to a PTO shaft through a PTO transmission shaft onto which the PTO clutch is disposed, and the PTO brake unit for stopping the rotation of the PTO shaft, are located in the rear chamber. The PTO brake is a hydraulic actuation-type which forms a cylinder chamber on the side wall of a housing of the rear chamber. Pistons are housed in the cylinder chamber and a brake pad provided at the utmost end of a piston rod is pressed onto the outer peripheral surface of a clutch casing of the PTO clutch to thereby exert the braking action.

The brake pad, however, must strongly be pressed onto the clutch casing, whereby a large braking capacity is required to enlarge the PTO brake unit. Furthermore, the cylinder for actuating the PTO braking unit must be enlarged. Since the cylinder chamber is in the rear housing, an oil pressure supply passage for making the brake unit inactive when the PTO clutch is "on", is required to lead from the front housing to the rear one. As a result, the brake response is delayed due to conduit resistance. If a larger amount of inertia is mounted on the vehicle driven by the PTO shaft, the PTO clutch, when put on, is abruptly connected and applies a large force to the PTO shaft and input shaft. In such cases, the engine experiences a large shock and may stop.

On a step at one lateral side of the vehicle is disposed a running pedal for operating the HST which is forward-rearward-switchable. On the step at the other lateral side are disposed two left and right turn brake pedals independently operable of the left and right brake units provided on the vehicle. One master brake pedal is disposed in the vicinity of the running pedal, which is well-known by, for example, Japanese Patent Publication No. Hei 6-20867.

In the above-mentioned technique, a support cylinder is laterally and rotatably mounted to a support frame below the seat. The right turn brake pedal is fixed to one end of the support cylinder and a first outer cylinder is fixed to the other end. And, an abutting arm, attached to the first outer cylinder is connected with the left and right brake units. A pedal shaft is relatively rotatably fitted into the support cylinder. Onto one end of the pedal shaft is fixedly fitted a second outer cylinder on which is mounted the left turn brake pedal. The second outer cylinder connects with the left running brake unit. Thus, when the left and right turn brake pedals are trod the left and right brake units, respectively, are independently exerted. The other end of the pedal shaft outwardly projects from the first outer cylinder and provides the abutting arm. A boss portion of the master brake pedal is relatively rotatably fitted onto the support cylinder adjacent to the first outer cylinder, and an interlocking member is provided on the boss portion, so that, when the master brake pedal is trod, the interlocking member simultaneously abuts against the abutting arm of the first outer cylinder and that of the brake shaft so as to simultaneously exert the left and right brake units.

In order to stop a vehicle having a running pedal, left and right turn brake pedals and master brake pedal, an operator changes his right foot treading upon the forward or rearward running pedal to the master brake. For a nimble foot change, the master brake pedal must be easy to operate with respect to the respective running pedals. In the vehicle provided with a locking mechanism capable of fixing and releasing the running pedal in an optional forward movement operating position, when the left and right brake its equipped on the vehicle are simultaneously actuated, the locking mechanism must simultaneously be released. It is suggested that the locking mechanism be released in association with treading the master brake pedal. The conventional construction, however, sets the axis of rotation of the master brake pedal necessarily on the axis of rotation of the turn brake pedal. Therefore, the position of the master brake pedal is inevitably restricted to the running pedal or the locking mechanism, when designing the layout of the transmission.

Furthermore, the support cylinder for fixing the right turn brake is relatively rotatably fitted onto the outer periphery of the brake shaft to which the left turn brake is fixed. The cylinder fixing thereon the master brake is relatively rotatably fitted onto the outer periphery of the support cylinder. This triple construction applies a frictional force on both the brake shaft and the cylinders, for example, when the right turn brake pedal is trod to rotate the cylinder. When the outside air temperature is low and the viscosity of lubricating oil interposed between the brake shaft and the support cylinder and between the support cylinder and the cylinder is high, the frictional force is enlarged. As a result, the brake shaft and cylinder rotate together, raising the concern that both brake units might malfunction, and cause the vehicle to stop, when the vehicle is intended to be turned rightward.

In the construction such that the pedal shaft mounting thereon the left and right turn brake pedals and the pedal shaft for mounting thereon the master brake pedal are coaxially disposed, when the master brake pedal is trod, the interlocking member of the master brake pedal simultaneously strike the respective abutting arms of the left and right brake pedals. Therefore, in order to simultaneously operate the left and right brake units, the respective abutting arms and the interlocking member must accurately be positioned for mounting. When parts are processed or assembled in error, the interlocking member may mis-time the striking of the abutting arms. If the abutting arm, which strikes the interlocking member, operates one brake unit in advance, the vehicle cannot be stopped in a straight line. Moreover, even if the abutting arm is accurately positioned, the abutting arm or the interlocking member may wear due to use for long time or excessive treading. Consequently, the aforesaid timing may go wrong, making it extremely difficult to precisely adjust the brake unit.

SUMMARY OF THE INVENTION

An object of the present invention is to provide a compact transmission which can drive front wheels, rear wheels, and a PTO shaft. For this purpose, first and second chambers are formed in the front and the rear of a housing. An HST is housed in the first chamber and a gear-type speed changing unit is housed in the second chamber. Both members are connected in a driving manner. On the inner surface of a front wall constituting the first chamber is disposed a hydraulic pump and a hydraulic motor, constituting the HST. On the outer surface of the same is disposed another hydraulic pump separate from the first. A vacancy in the first chamber houses a clutch mechanism for engaging or disengaging a front wheel driving shaft with or from an output portion of the gear-type speed changing unit.

Another object of the invention is to restrain acceleration of rearward movement of the vehicle. Where the output rotation speed of the HST is changed by the gear-type speed changing unit to the high speed setting, a restraint mechanism restrains the acceleration to a predetermined speed for rearward movement. The restrain is housed in the first chamber, and makes rearward movement in the high speed setting impossible.

Still another object of the invention is to form the front wall of the housing so that the hydraulic pump and hydraulic motor are mounted on and separable from the unit.

A further object of the invention is to provide a PTO transmission. The PTO transmission unit transmits power from an engine to a PTO shaft through a PTO clutch means. On a partition between the first chamber and the second chamber is disposed a PTO brake unit, for braking the PTO shaft when the PTO clutch mechanism disconnects.

It is a still further object of the invention that left and right running brake units, equipped on the vehicle, can independently exert the braking action by treading left and right turn brake pedals, respectively. A first brake pedal shaft and a second brake pedal shaft are disposed longitudinally of the vehicle body and laterally rotatably thereof in order to make possible the simultaneous braking action by treading a master brake pedal. At one lateral end of the second brake pedal shaft are juxtaposed turn brake pedals for desirable, independent braking of the left and right running brakes. The master brake pedal is disposed at the other lateral ends of the first brake pedal shaft. At one lateral end of the first brake pedal shaft is provided a simultaneous brake operating mechanism with respect to a trip-turn brake pedal.

These and other objects, features and advantages of the invention will become more apparent upon a reading of the following detailed specification and drawings.

DETAILED DESCRIPTION OF THE PREFERRED EMBODIMENTS

Figure 1:
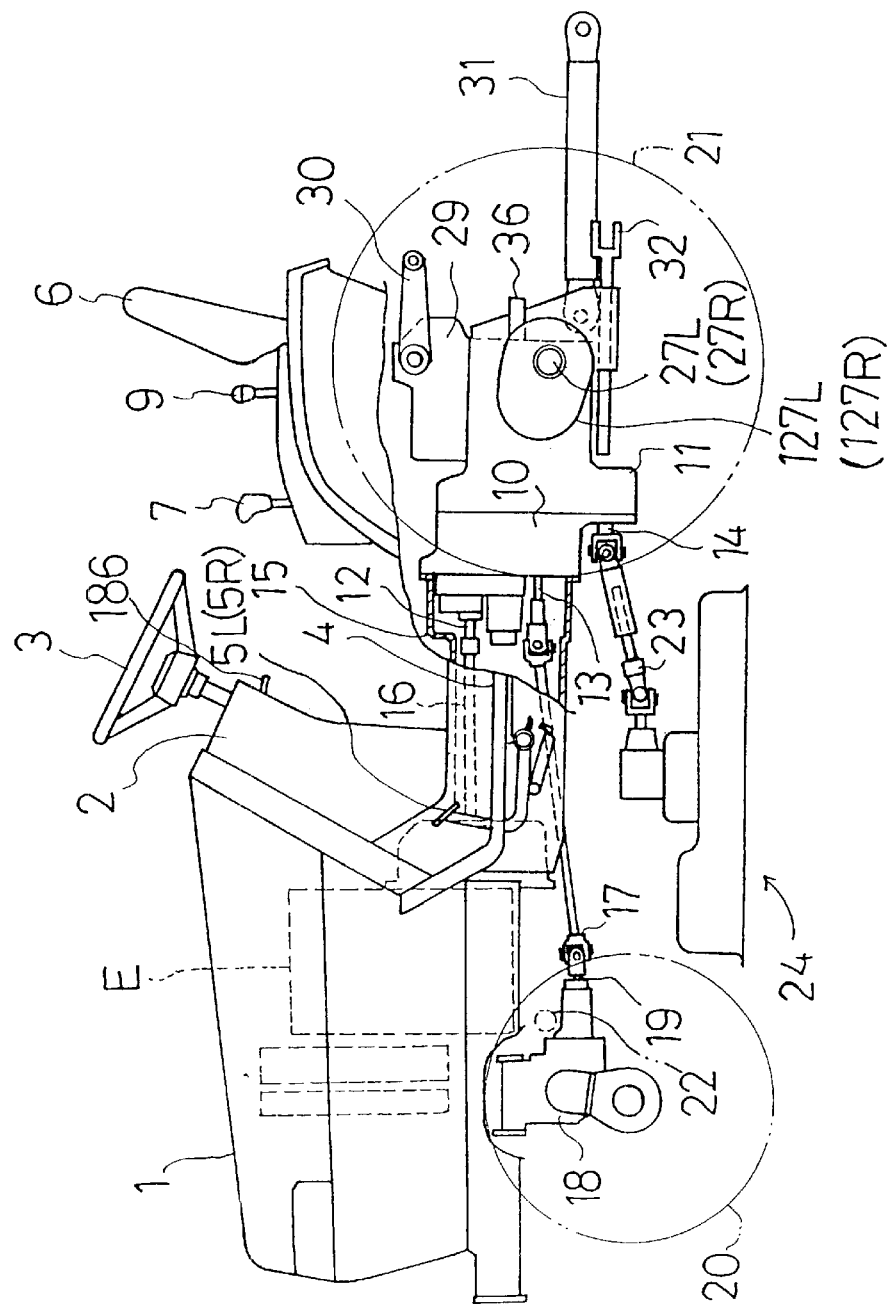
FIG. 1 is a side view of a working vehicle incorporating the present invention.

Explanation will be given on the entire construction of a mid-mount mower type working vehicle in accordance with FIG. 1, in which: an engine E is mounted on a vehicle body frame in a bonnet 1 in the front of the vehicle body; a dashboard 2 is disposed behind the bonnet 1; a handle 3 is disposed on the dashboard 2; steps 4 are disposed at both sides below and between the dashboard 2 and a seat 6; brake pedals 5L and 5R are disposed on the left side of step 4; a forward running pedal 8F and a rearward running pedal 8R, to be discussed below, are juxtaposed on the right side step 4; and at the lateral side of the seat 6 are disposed a sub-speed-changing lever 7 and a PTO switching lever 9.

Under the seat 6 is disposed a transmission of the present invention. The transmission comprises a hydrostatic transmission (hereinafter referred to as HST), a gear-type speed changing unit and a PTO transmission unit housed in a front casing 10 and a rear casing 11. An input shaft 12, a front wheel driving shaft 13, and a mid-PTO shaft 14 forwardly project from the front casing 10. With the input shaft 12 are interlocked a crank shaft of the engine E through a damper and a transmission shaft 16 in a vehicle body frame 15. The front wheel driving shaft 13 connects through a universal joint 17 with an input shaft 19 projecting from the front axle casing 18 through a universal joint 17. Thus, power is transmitted from the front wheel driving shaft 13 to the input shaft 19 which in turn drives front wheels 20 journalled to the left and right sides of front axle casing 18. Reference numeral 22 designates a hydraulic cylinder which expands and contracts by operating a handle 3 so as to steer the front wheels 20. The mid-PTO shaft 14 interlocks through a universal joint 23 with an input shaft 26 projecting from a gear box 25 of a mower 24, which is constructed to elevate and fall by a lift (not shown) with respect to the ground surface in a space between the front wheels 20 and the rear wheels 21.

Rear axle boxes 127L and 127R are mounted at both side surfaces at the rear of the rear casing 11. Axles 27L and 27R laterally project and pivotally support rear wheels 21 for driving. On the upper surface of the rear casing 11 is mounted a hydraulic cylinder casing 29 for a hydraulic lift. A pair of left and right lift arms 30 rearwardly project from the cylinder casing 29. Lower links 31 are pivotally supported at the front portions thereof onto the rear surface of the rear casing 11. A plate provided with a draw bar hitch 32 is mounted to the lower end of the same. A working machine is mountable in relation of freely raising and lowering the lift arms 30, lower links 31 and top links (not shown), and a traction working machine is mountable to the draw bar hitch 32.

Next, explanation will be given on the structure of the transmission in accordance with FIGS. 2 and 3, in which the front casing 10 and rear casing 11 are longitudinally divisibly jointed to form the housing. The front casing 10 forms in the front surface thereof a front wall 10a and at the rear surface a rear wall 10b. A flange 10h for mounting the transmission to the end of the body frame 15 is formed in the periphery of the front wall 10a. Within the flange 10h is mounted a center section 40 for closing an opening formed in the front wall 10a of the front casing 10. A first chamber R1 is formed between the rear wall 10b of the front casing 10 and the center section 40. The center section 40 supports a hydraulic pump P1 and a motor M, to be discussed below, and forms part of the front wall 10a. A bore for supporting a front wheel driving shaft 13 is formed on the front wall 10a at the vertically lower and about laterally center portion thereof. The rear casing 11 is open at the front end thereof and a partition 11a is provided at the longitudinal center of the body so as to longitudinally divide the interior of the rear casing 11. A second chamber R2 is formed between the rear wall 10b of the front casing 10 and the partition 11a. A third chamber R3 is formed between the partition 11a and a rear wall 11c of the rear casing 11. Furthermore, a recess is formed on the outer surface of the rear wall 11c of the rear casing 11. The recess is closed by a lid 79 so as to form a fourth chamber R4.

An input shaft 12 is supported at the upper portion of the first chamber R1 and between the center section 40 and the rear wall 10b. The hydraulic pump P1 is disposed inside the first chamber R1 on the center section 40. The input shaft 12 drives the hydraulic pump P1. Outside the center section 40 is disposed a pump casing 105. Inside the pump casing 105 is a charging pump P2. The input shaft 12 penetrates the pump casing 105 so that the input shaft 12 also drives the charging pump P2. A first running transmission shaft 41 is supported in the first chamber R1 at substantially the longitudinal center. The hydraulic motor M, mounted on the outside of the center section 40, is disposed coaxially of the first running transmission shaft 41. The hydraulic pump P1 and hydraulic motor M are fluidly connected with each other through an oil passage bored in the center section 40, to be discussed below, thereby constituting the HST. The hydraulic pump P1 and hydraulic motor M are mounted in a position on the front wall 10a separate from the housing, thereby facilitating the assembly of HST and of the front casing 10.

Figure 2:
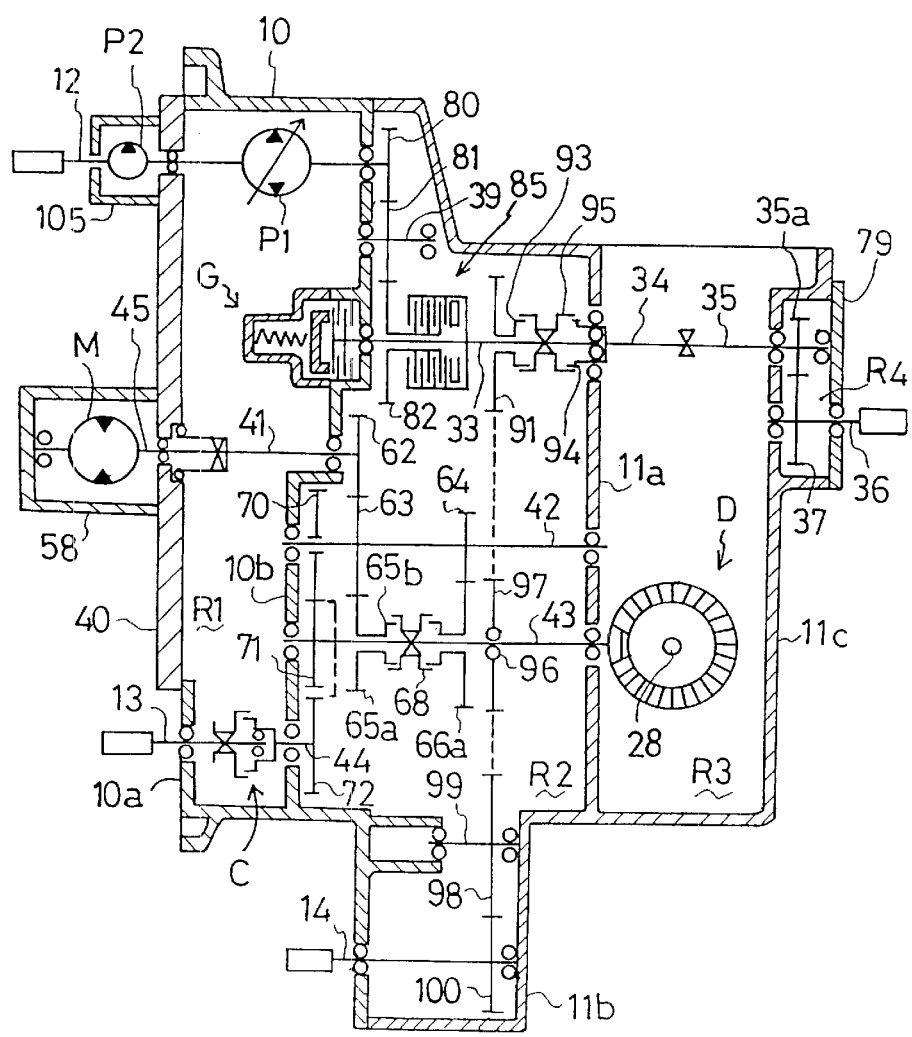
FIG. 2 is a schematic diagram of the power transmission of a running system and a PTO system of the present invention.
Figure 8:
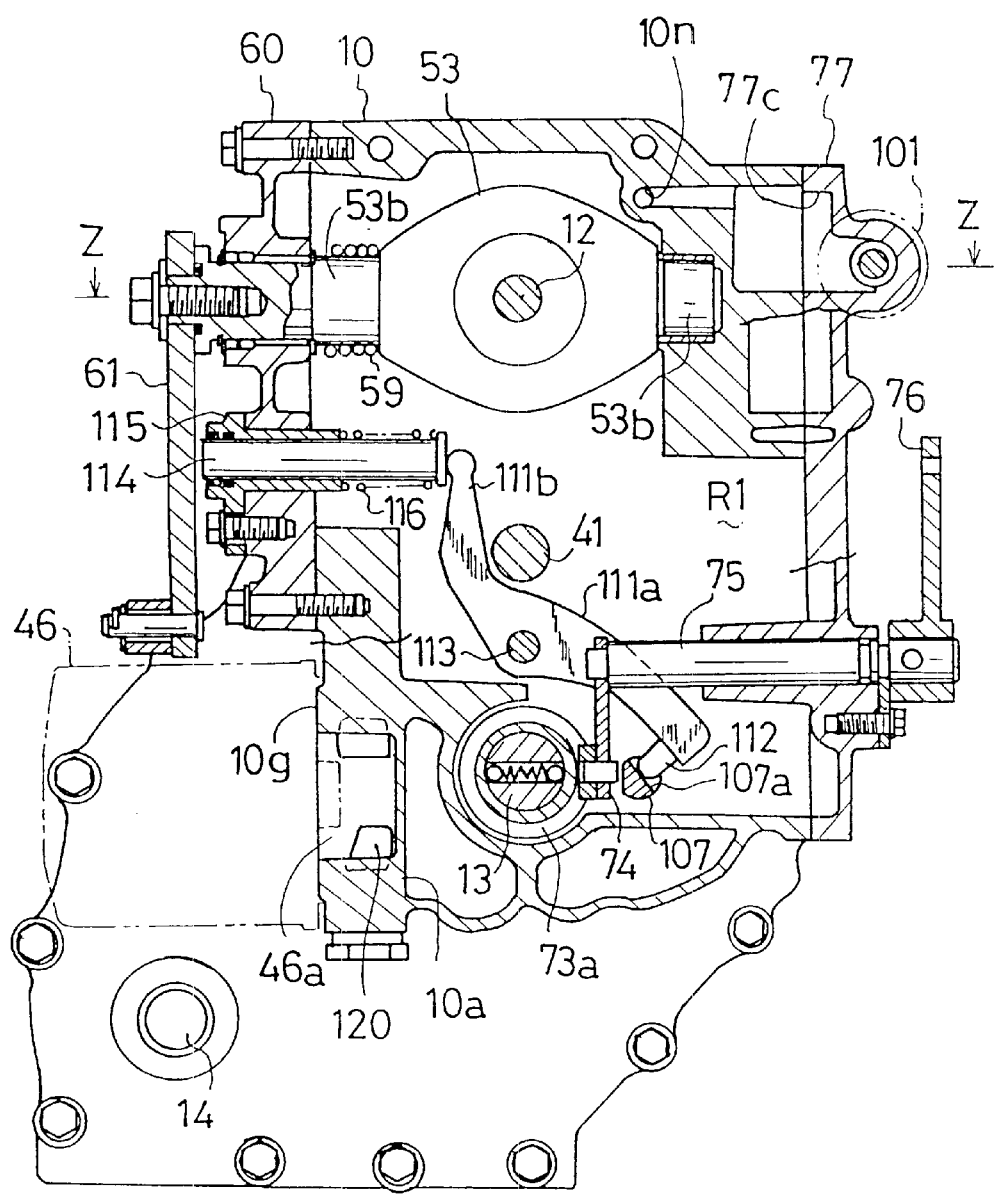
FIG. 8 is a cross-sectional view looking in the direction of the arrows X—X in FIG. 3.
Figure 22:
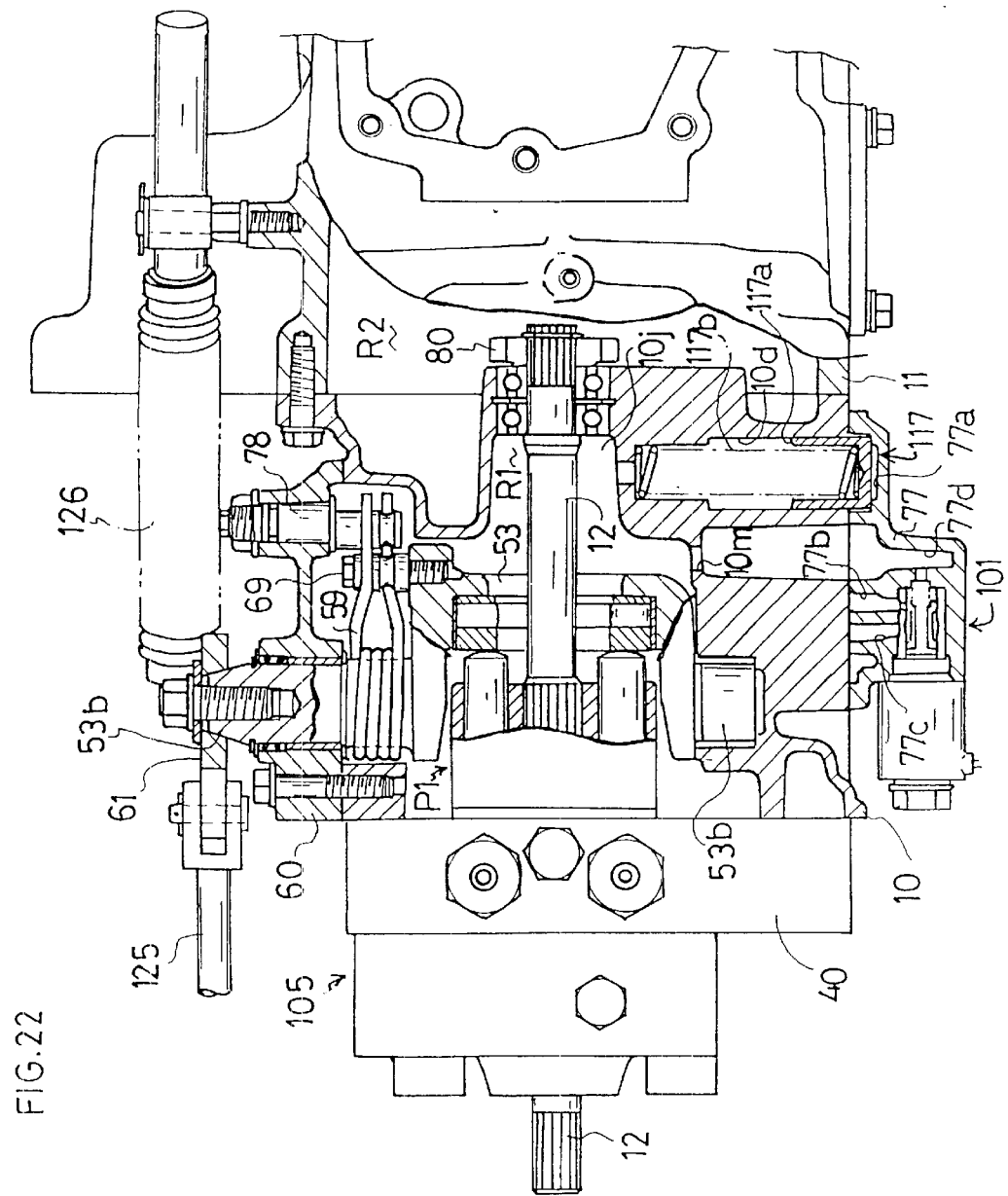
FIG. 22 is a cross-sectional view looking in the direction of the arrows Z—Z in FIG. 8.

With reference to FIG. 2, the hydraulic pump P1 is constructed so that a cylinder block 51 is rotatably disposed on a pump mounting surface 50 formed on the upper, inner surface of the center section 40. The input shaft 12 engages with the cylinder block 51 at the center thereof. Axial pistons 52 are housed in a plurality of cylinder bores in the cylinder block 51. Axial pistons 51 are movable in reciprocation through biasing springs, and abut at the heads against a thrust bearing 53a of a movable swash plate 53. The movable swash plate 53 can slant the abutting surface of the thrust bearing 53a from the vertical condition shown, around trunnions 53b projecting sidewardly from the movable swash plate 53. As shown in FIG. 8, one trunnion 53b is rotatably supported at the inner surface of the left side wall of the front casing 10 and the other is rotatably supported at the right side plate 60. Right side plate 60 closes an opening formed at the right side wall of the front casing 10. Onto the outer periphery of the other trunnion 53b is fitted a neutral return spring 59 (refer to FIG. 22). Both ends of the neutral return spring 59 extend in the same direction and cross each other so as to sandwich therebetween a movable pin 69 mounted on the side surface of the movable swash plate 53 and a fixed eccentric pin 78 mounted on the inner surface of the right side plate 60. Pin 78 is set in a predetermined position to return the movable swash plate 53 to the accurate neutral position. The trunnion 53b projects through to the outside of the right side plate 60 and a speed control arm 61 is fixed to the projection of trunnion 53b. The speed control arm 61 is interlocked with a forward running pedal 8F and a rearward running pedal 8R (refer to FIGS. 28 and 29) disposed on the step 4 through a connecting rod 125 to be discussed below.

Figure 3:
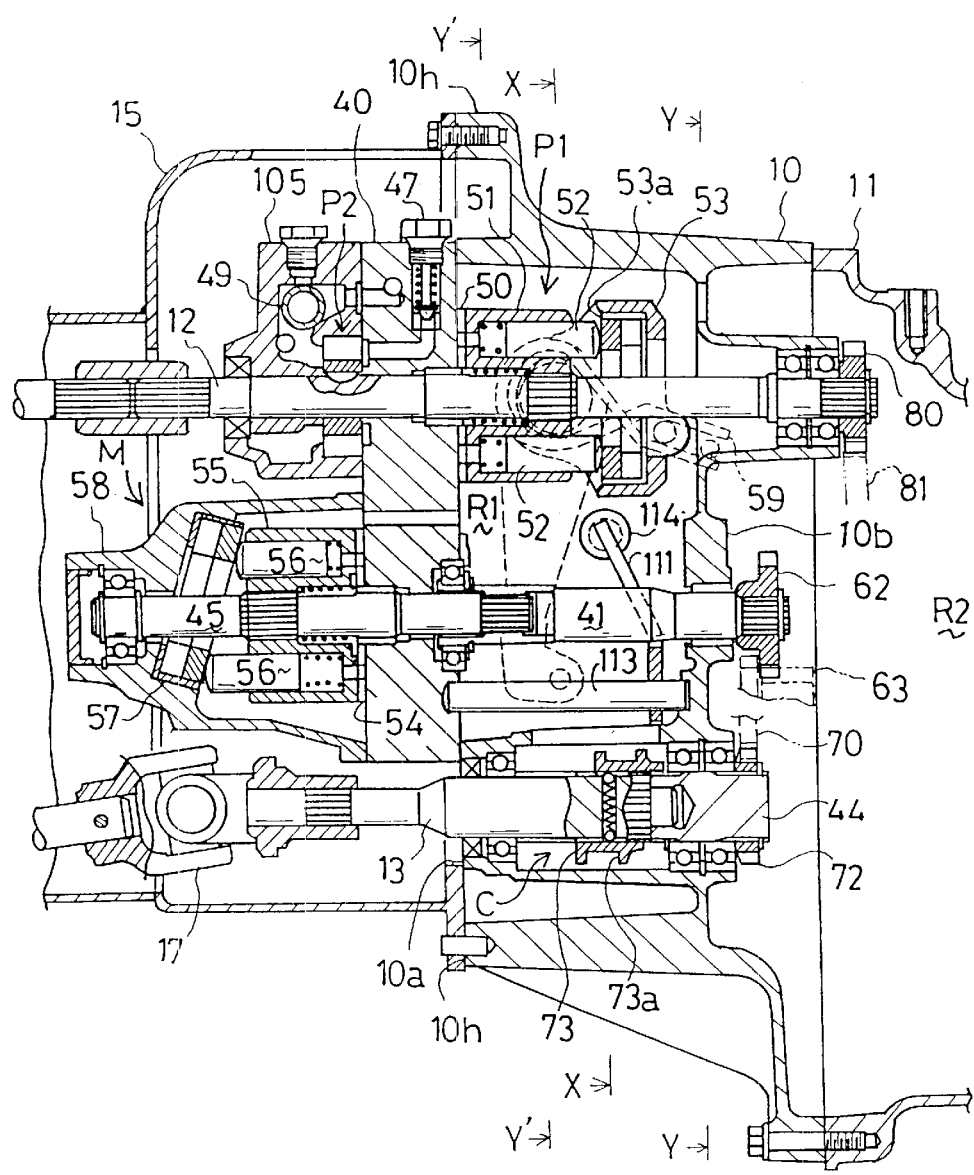
FIG. 3 is a cross-sectional side view of a front casing of the present invention.

In FIG. 3, a motor mounting surface 54 is formed on the lower outer surface of the center section 40. On the motor mounting surface 54 is rotatably disposed a cylinder block 55. An output shaft 45 engages with the central portion of the cylinder block 55. A plurality of axial pistons 56 are housed in a plurality of cylinder bores in the cylinder block 55. Through biasing springs the axial pistons 56 are movable in reciprocation, and abut at the heads against a fixed swash plate 57. The fixed swash plate 57 and cylinder block 55 are housed in a motor casing 58 mounted onto the outer surface of the center section 40. Consequently, the lower inner surface of the center section 40 at the side opposite to the motor mounting surface 54 is vacant, thereby creating a wide space in the first chamber R1 for housing a restraint mechanism for high speed rearward movement and a front wheel driving clutch mechanism C.

Figure 9:
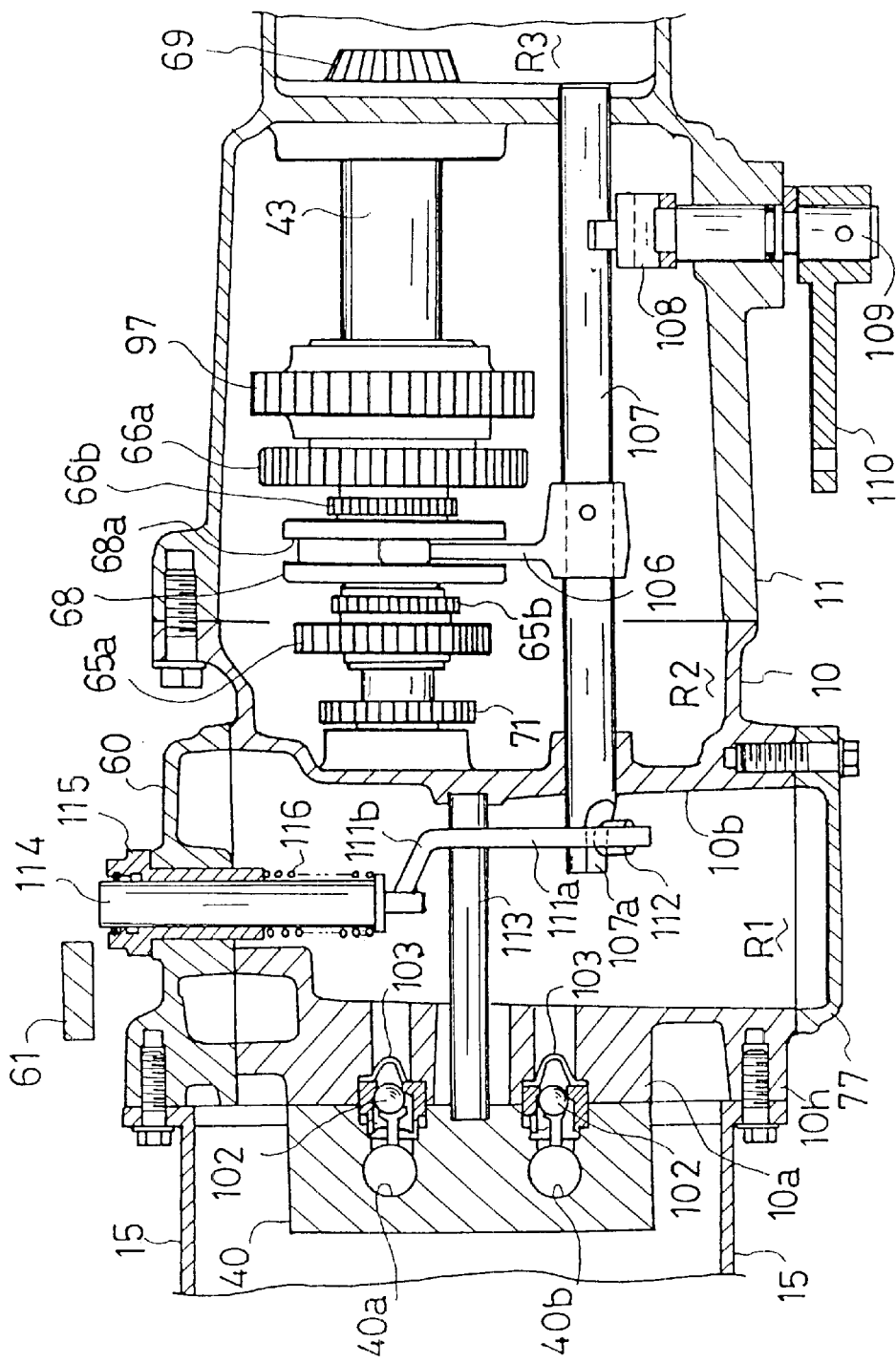
FIG. 9 is a cross-sectional plan view of a speed changing portion of the gear-type speed changing unit and a rearward speed change restraint unit, engageable with the speed change operating portion.
Figure 10:
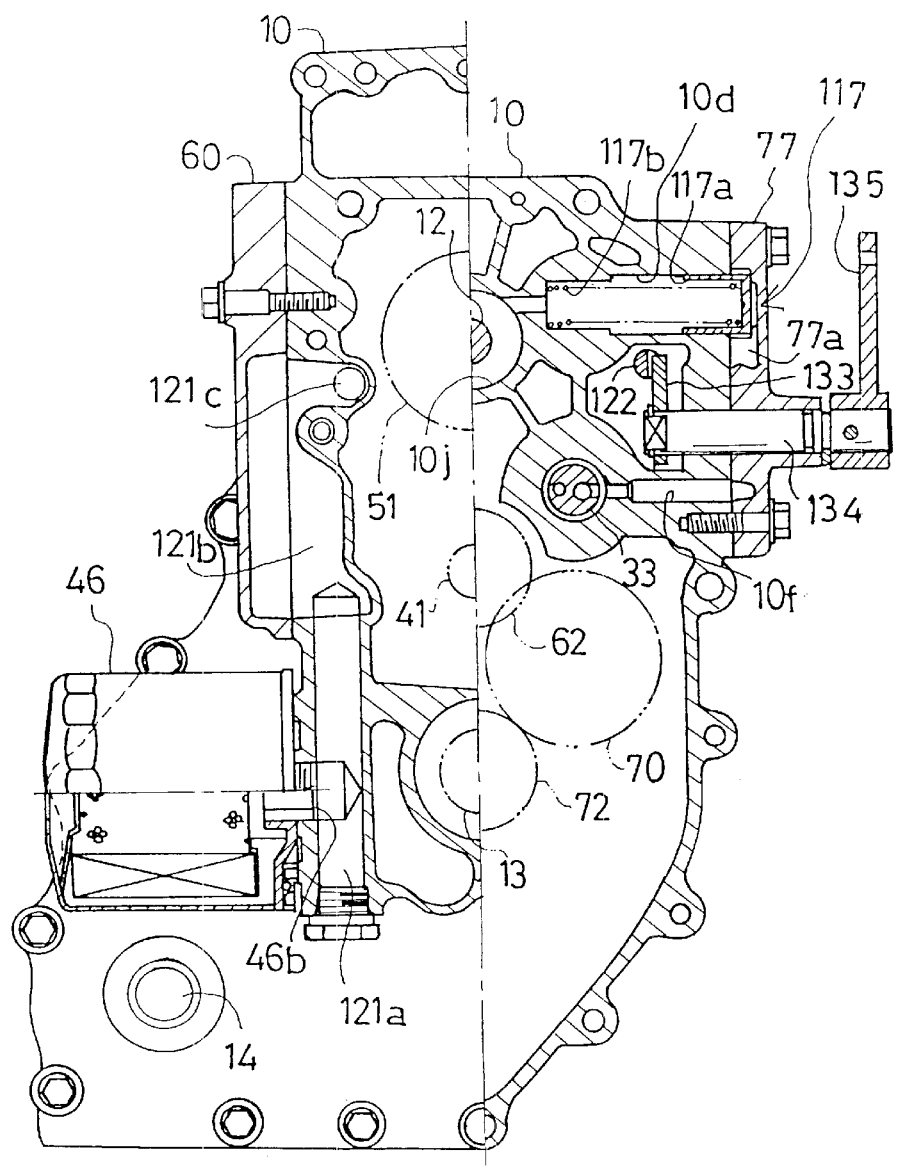
FIG. 10 is cross-sectional views looking in the direction of the arrows Y—Y in the right side of FIG. 3 and a cross-sectional view looking in he direction of the arrows Y'—Y' in the left side of FIG. 3.
Figure 11:
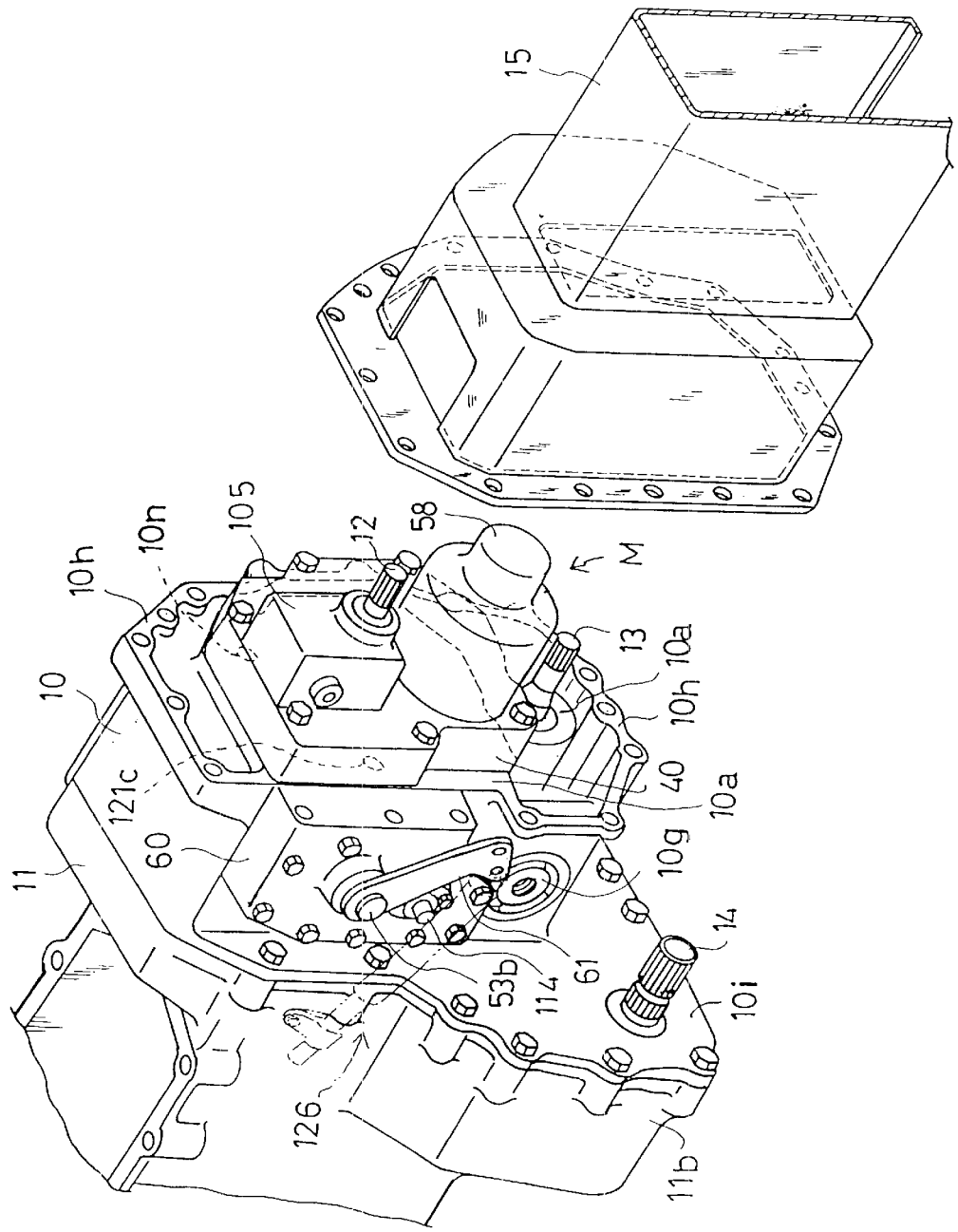
FIG. 11 is a front perspective view of the housing.

The hydraulic pump P1 and hydraulic motor M are fluidly connected with each other through a pair of oil passages 40a and 40b (refer to FIG. 9) so as to form a closed fluid circuit into which pressurized oil is supplied from charging pump P2 provided on the input shaft 12. As shown in FIGS. 8, 10 and 11, a filter mounting portion 10g for detachably mounting an oil filter 46 to the right side wall of the front casing 10 is formed at the lower outer surface of the casing 10. An oil bore 46a formed in the filter mounting portion 10g and communicating with an inlet port of the oil filter 46, as shown in FIG. 8, communicates with the second chamber R2 through an oil bore 120 open at the rear wall 10b. Lubricating oil stored in the second chamber R2 is guided into the oil filter 46 from the oil bore 120 through the oil bore 46a. After filtration by the oil filter 46, oil is guided from an outlet port 46b (refer to FIG. 10) of the oil filter 46 through an oil passage 121a, provided at a thick portion of the right side wall of the front casing 10, to a suction port of the charging pump P2. An oil passage 121b is formed between the inner surface of the right side plate 60 and the outer surface of the right side wall of the front casing 10. At the top of oil passage 121b, oil passage 121c opens on the front of casing 10, allowing oil to pass to an oil passage in the center section 40.

Thus, the hydraulic pump P1 is housed in the first chamber R1, whereby the oil stored therein is apt to be at a relatively high temperature. On the other hand, the gear-type speed changing unit and a PTO transmission unit, to be discussed below, are housed only in the second chamber R2, wherein the temperature of oil therein is not so high. Hence, the oil at a relatively low temperature is taken in the charging pump P2 through the oil filter 46 and supplied to the closed circuit of the HST, improving the durability of the hydraulic pump and hydraulic motor. Also, elements related to the oil filter 46 are collectively disposed in the front casing 10, so that short and simple oil passage construction, without piping, can take in the oil within the rear casing 11, thereby reducing the manufacturing cost.

Figure 12:
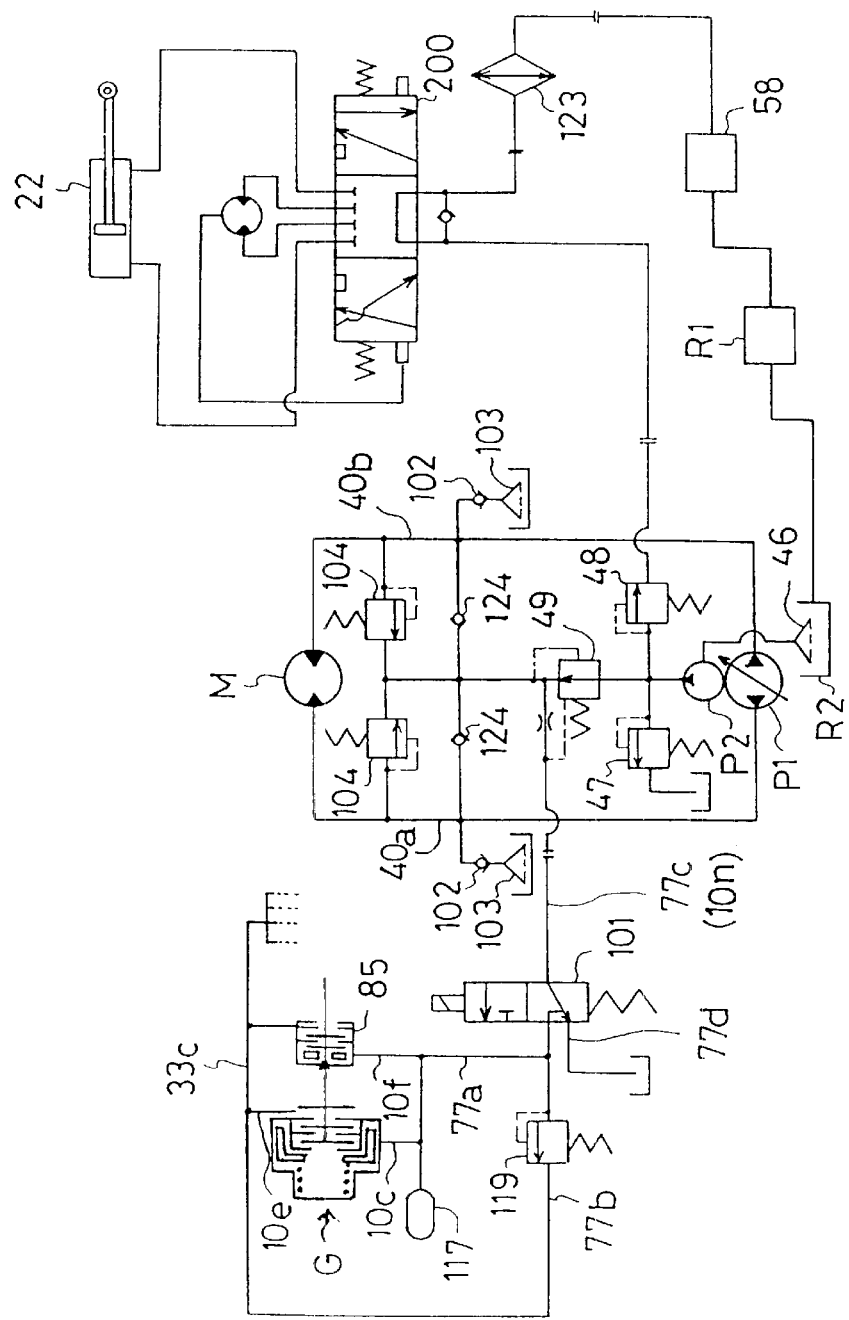
FIG. 12 is a hydraulic circuit diagram.

Pressurized oil discharged from a discharge port of the charging pump P2, as shown in FIG. 12, is set by a main relief valve 47. Part of the pressurized oil is sent to a directional control valve 200 for power steering through the piping and to a resistance valve 48 housed in the casing 105 for the charging pump P2. When the directional control valve 200 is switched by the rotation of the handle 3, oil is sent to advance and retract a chamber of a double action hydraulic cylinder 22, thereby steering the front wheels. The return oil from the steering cylinder 22 is returned to an oil cooler 123 and a motor casing 58 through the piping, and further sequentially flows into the first chamber R1 through an oil bore at the center section 40 and into the second chamber R2 through an oil bore at the rear wall 10b. The pressure of the oil discharged from the charging pump P2 is adjusted by a pressure reducing valve 49 housed in the casing 105 for the charging pump P2. The oil pressure opens one of the check valve 124 at the low pressure side to supply oil to either oil passage 40a or 40b in the closed circuit. When the oil pressure at the high pressure side oil passage 40a becomes higher than a set pressure, a high pressure relief valve 104 is actuated. Drain oil produced when the pressure reducing valve 49 is actuated for pressure adjustment, is sent to a PTO clutch brake control valve 101.

The oil passages 40a and 40b constitute a closed circuit. As shown in FIG. 9, oil passages 40a and 40b connect with check valves 102—having oil filters 103 contained in the front wall 10a of the front casing 10. If a vehicle stops its engine E on a slope and the oil in the closed circuit leaks from hydraulic motor M or hydraulic pump P1 to cause a decrease in operating oil, the lubricating oil in the first chamber R1 is supplied by self suction, due to negative pressure, into the closed circuit through the oil filters 103 and check valves 102. As shown in FIG. 3, the main relief valve 47 is situated at the upper portion of center section 40 for setting the discharge oil pressure of the charging pump P2 at the specified value.

Figure 4:
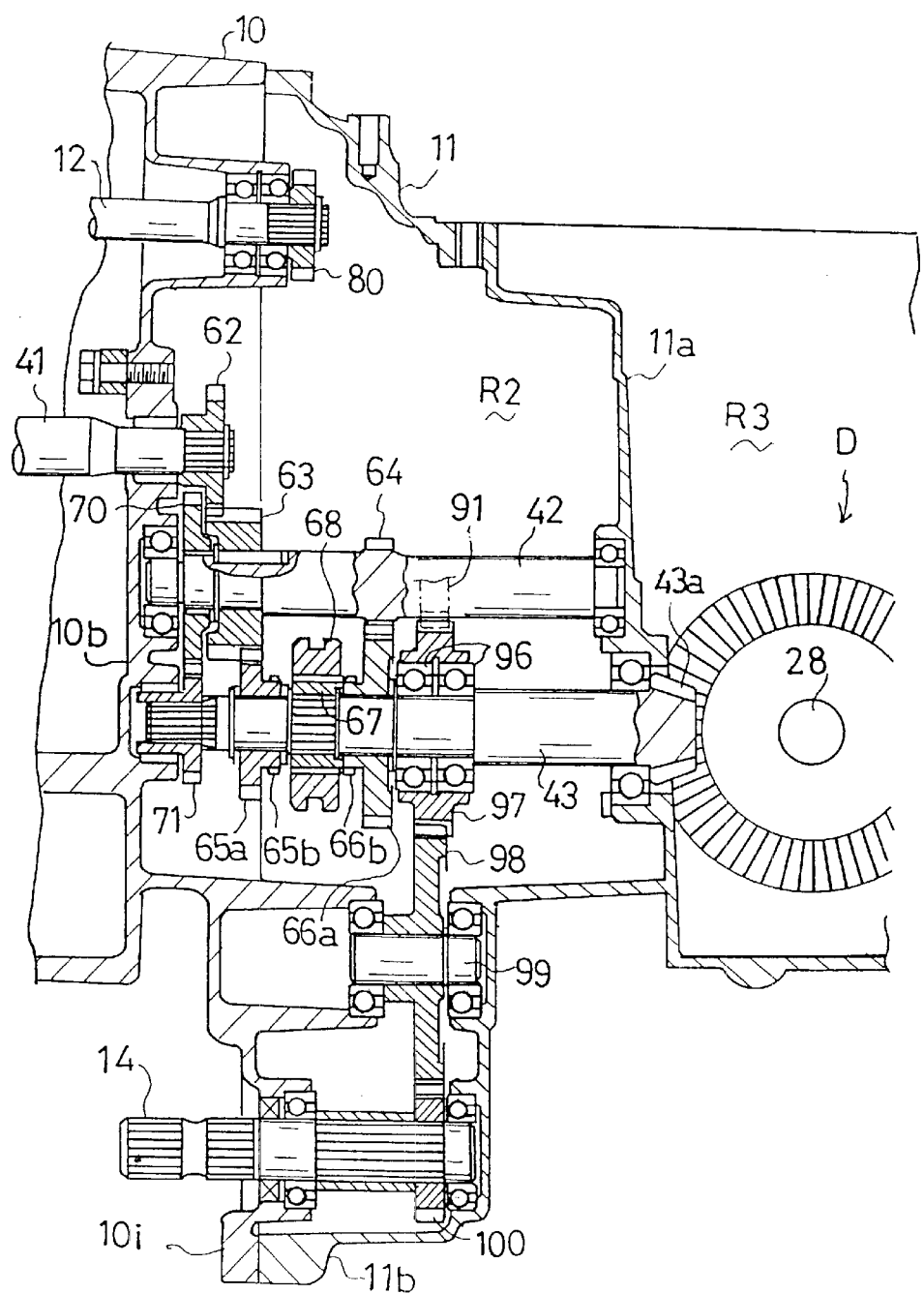
FIG. 4 is a cross-sectional side view showing a gear-type speed changing unit and a power transmission mechanism to a mid-PTO shaft.
Figure 5:
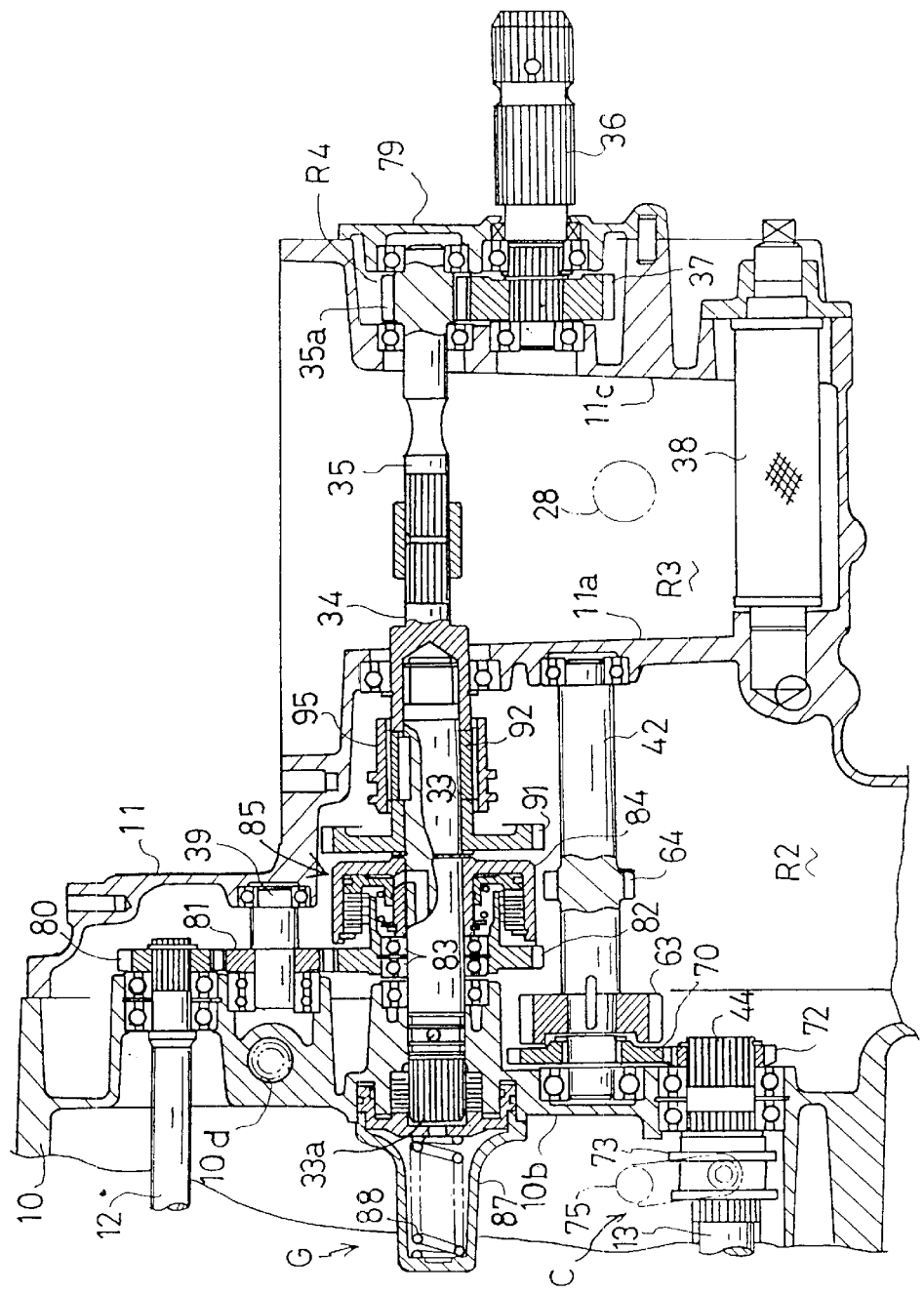
FIG. 5 is a cross-sectional side view of an upper portion of a housing, showing a power transmission mechanism to a front wheel driving shaft and a power transmission mechanism to a rear PTO shaft.

Next, as shown in FIGS. 2, 4 and 5, a PTO counter shaft 39, a PTO transmission shaft 33, a second running transmission shaft 42 and a third running transmission shaft 43 are journalled between the rear wall 10b of the front casing 10 and the partition 11a in the rear casing 11 longitudinally parallel to each other through bearings. Enlarged portions 10i and 11b downwardly and slantingly project from the joint portion between the front casing 10 and the rear casing 11. A counter shaft 99 and a mid-PTO shaft 14 are rotatably and longitudinally journalled in the swollen portions 10i and 11b through bearings, respectively.

Also, as shown in FIG. 5, at the upper portion in the third chamber R3 a rear PTO driving shaft 35 is longitudinally journalled. Rear PTO driving shaft 35 is coaxial with the PTO transmission shaft 33. At the bottom in the third chamber R3 are juxtaposed a differential gear unit D and an oil filter 38 for the hydraulic lift. The rear PTO driving shaft 35 enters at the rear end thereof into the fourth chamber R4 and a gear 35a is engraved onto the extension entering therein. In the fourth chamber R4, between the rear wall 11c and the lid 79, a rear PTO shaft 36 is journalled. Within the fourth chamber R4, a gear 37 is mounted on shaft 36 so that the gear 35a engages with a gear 37. The rear PTO shaft 36 projects outwardly from the rear of the housing through the lid 79.

Next, explanation concerns will be given on a power transmission mechanism of the transmission in accordance with FIGS. 2 through 7 As mentioned above, power is transmitted to the input shaft 12 from the engine E through a damper and coupling shaft 16. The hydraulic pump P1 and charging pump P2 are driven by the input shaft 12 and oil pressure from the hydraulic pump P1 is sent to the hydraulic motor M so as to steplessly drive the output shaft 45. The first running transmission shaft 41 is integrally spline-coupled with the rear end of the output shaft 45. A gear 62 is fixed to the rear end of the shaft 41 perforating the rear wall 10b.

Next, explanation will be given on the gear-type speed changing unit. As shown in FIGS. 2 and 4, the gear 62 on the first running transmission shaft 41 engages with a larger diameter gear 63 fixed onto the second running transmission shaft 42. The larger diameter gear 63 permanently engages with a smaller diameter gear 65a, which is freely rotatably fitted onto the third running transmission shaft 43. A smaller diameter gear 64 is fixed onto the second running transmission shaft 42 and permanently engages with a larger diameter gear 66a. Gear 66a is freely rotatably fitted onto the third running transmission shaft 43. A hub 67 is fixed on the third running transmission shaft 43 between the smaller diameter gear 65a and the larger diameter gear 66a. A clutch slider 68 is non-relatively rotatably and axially slidably spline-fitted onto the hub 67.

A shift fork 106, as shown in FIG. 9, is retained by an annular recess 68a formed on the outer periphery of the clutch slider 68. The shift fork 106 is fixed to a shifter shaft 107, and the front portion thereof is interlocked with a rearward speed change restraint mechanism of a speed control arm 61 to be discussed below. The rear portion of the shifter shaft 107 engages with a pin projecting from an arm 108. The arm 108 is fixed to the inner end of a switching shaft 109 pivotally supported to the left side wall of the rear casing 11. At one outer end of the switching shaft 109 is fixed a high-low ("H-L") switching arm 110, which is connected with the aforesaid sub-speed change lever 7 through a link or the like.

Engaging members 65b and 66b provided on the gears 65a and 66a are respectively formed to be engageable with the internal teeth of the clutch slider 68. Therefore, when the sub-speed-change lever 7 is operated, the clutch slider 68 is axially slidably moved through the H-L switching arm 110, switching shaft 109, arm 108, shifter shaft 107 and shifter fork 106, so that either one of the gears 65b or 66b engages with the third running transmission shaft 43, thereby providing a two high-low step speed change.

More particularly, when the sub-speed change lever 7 is shifted to the high speed position, the clutch slider 68 engages at the internal teeth thereof with the engaging member 65b of the smaller diameter gear 65a, so that the power from the output shaft 45 is transmitted through the first running transmission shaft 41 to gear 62, to larger diameter gear 63, to smaller diameter gear 65a, to engaging member 65b, to slider 68, to hub 67, to third running shaft 43 and power of the high speed rotation is transmitted from a bevel pinion 69 provided on the rear end of the third running transmission shaft 43 to the axle 27 through the differential gear unit D.

When the sub-speed-change lever 7 is operated in the low speed position, the clutch slider 68 engages at the internal teeth thereof with the engaging member 66b of the larger diameter gear 66a, so that power from the output shaft 45 is transmitted through the first running transmission shaft 41, to gear 62, to larger diameter gear 63, to second running transmission shaft 42, to smaller diameter gear 64, to larger diameter gear 66a, to engaging member 66b, to clutch slider 68, to hub 67, to third running transmission shaft 43, thereby transmitting the power of low speed rotation to the axle 27, the same as mentioned above.

Next, explanation will be given on a restraint mechanism which restrains the speed control arm 61 when the rearward speed is changed. As shown in FIGS. 3, 8 and 9, the shifter shaft 107 extends at the front end into the first chamber R1. At the front end of the shifter shaft 107 is formed a cam surface cut semicircularly when viewed in section and having the deepest portion 107a. A restraint arm 111 is disposed below the hydraulic pump P1. The restraint arm 111 has a first arm 111a and a second arm 111b which extend in different directions from each other so as to be nearly V-like-shaped, and are fixed at the middle portion to the support shaft 113. The support shaft 113 is journalled between the center section 40 and the rear wall 10b of the front casing 10 and longitudinally axially of the vehicle body, thereby laterally swingably supporting the restraint arm 111.

Figure 20:
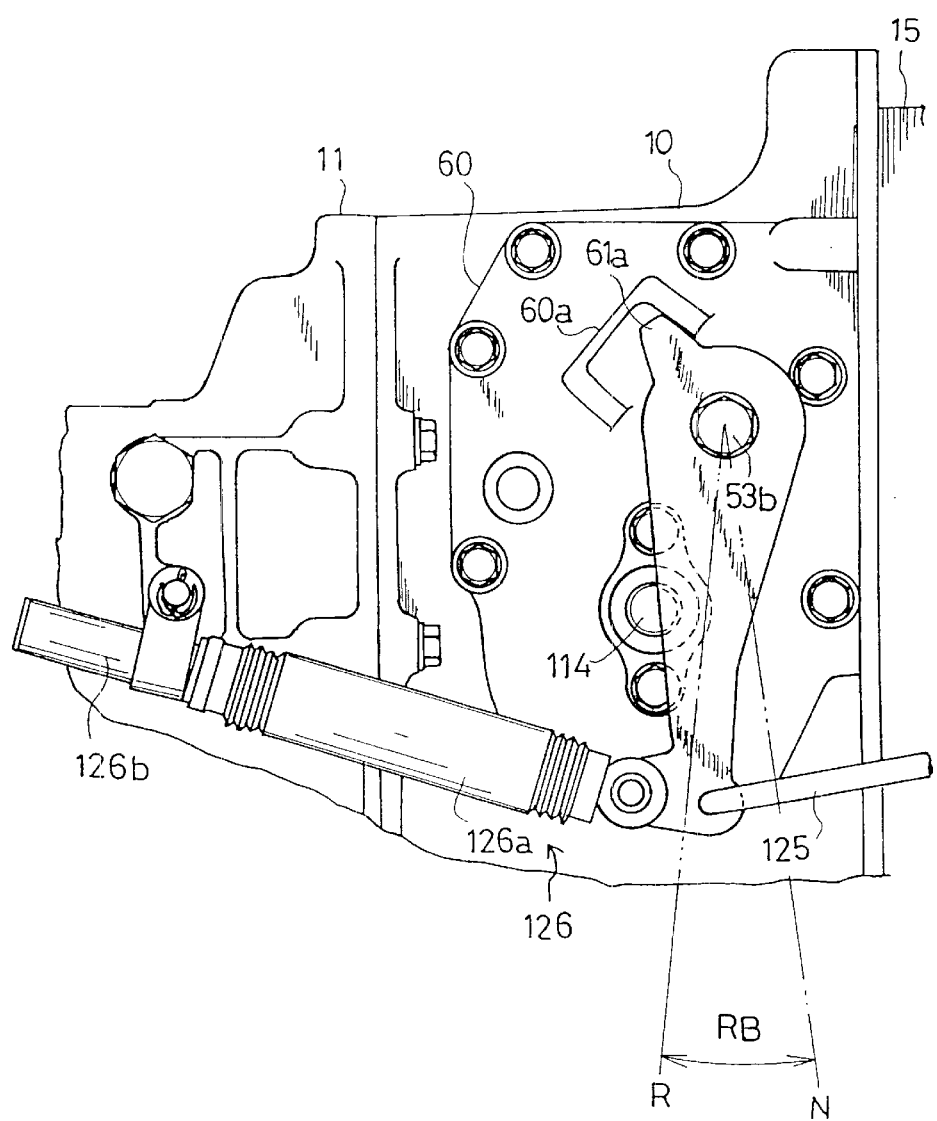
FIG. 20 is an elevational view showing the restraint mechanism when the speed control arm is in the maximum acceleration position at the rearward movement of the side brake.

A cam 112, provided at the utmost end of the first arm portion 111a of the restraint arm 111, abuts against the cam surface of the shifter shaft 107. The second arm portion 111b abuts at the utmost end thereof against one end surface of a restraint pin 114. The restraint pin 114 is positioned on the outer surface of the right side plate 60 and substantially at an intermediate portion of a rearward movement side speed change rotation range (RB) of the speed control arm 61, as shown in FIG. 20. The restraint pin 114 is pivotally supported by the side plate 60 so that it may inwardly and outwardly advance and retract parallel to the axis of slanting rotation. A spring 116 is fitted on the outer periphery of the restraint pin 114 positioned in the first chamber R1 so as to bias the restraint shaft 114 to retract into the first chamber R1.

Thus, the restraint mechanism is contained in the first chamber R1 for the HST, whereby a space in the first chamber R1 can effectively be utilized to reasonably dispose the restraint mechanism and impractical high speed rearward movement can automatically be restrained. Also, since the restraint mechanism is contained in the first chamber R1, there is little interference from foreign objects, such as dust, mud or rust, and the restraint mechanism stably accurately operates for a long time, thereby improving the durability and reliability. This construction requires fewer parts, allowing for more efficient and cheaper manufacture.

As shown in FIGS. 17 through 20, a speed control arm 61 is fixed onto the utmost end of a trunnion 53b and projects from the right side plate 60. On the rotating base side of speed control arm 61 is a retaining portion 61a, which is disposed within a U-Like-shaped stopper 60*a* and mounted on the outer surface of the right side plate 60. When the retaining portion 61*a* rotates to abut against the inside surface of the recess of the stopper 60*a*, the maximum forward accelerating position F and the maximum rearward accelerating position R are set. At the utmost end of the speed control arm 61 are mounted a connecting rod 125 and a telescopic member 126*a* for a shock absorber 126. The connecting rod 125 is interlocked with the forward running pedal 8F and rearward running pedal 8R which are disposed on the step 4. The shock absorber 126 is swingably pivoted at the base end 126*b* thereof onto the outer surface of the right side wall, and the telescopic member 126*a* prevents the speed control arm 61 from abrupt rotation.

Figure 18:
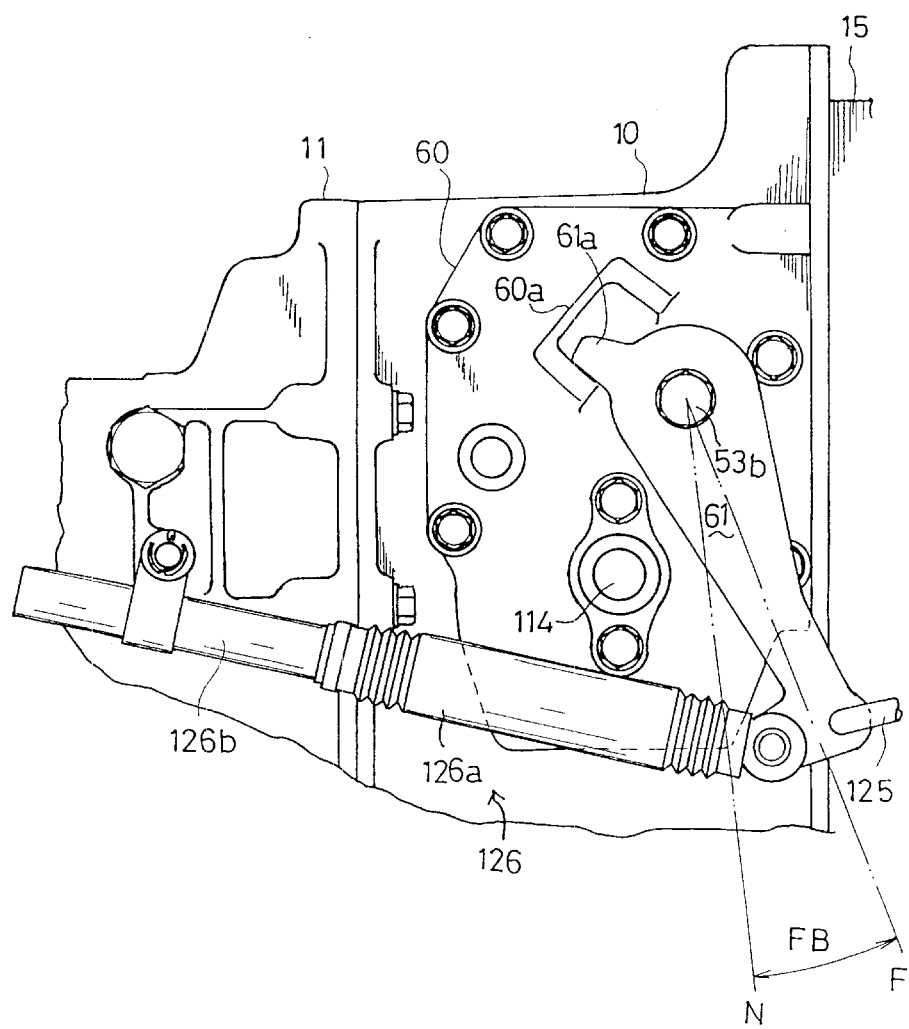
FIG. 18 is an elevational view showing the restraint mechanism when the speed control arm is in a maximum acceleration position at the forward movement side of the vehicle.

When the sub-speed-change lever 7 is turned to the neutral position and the low speed position, as shown in FIG. 8, the pin 112 is positioned on the deepest position 107*a* of cam surface, the restraint arm 111 is kept in the state as shown, and the speed control arm 61, as shown in FIGS. 18 and 20, can freely rotate within the entire ranges of the forward movement side speed change rotation (FB) and of rearward movement side speed change rotation (RB). When the sub-speed-change lever 7 is turned to the high speed position, the shifter shaft 107 slides forward and pushes the cam 112 at the utmost end of the first arm portion 111*a* of the restraint arm 111 whereby the restraint arm 111 swings counterclockwise in FIG. 8 around the support shaft 113 and the second arm portion 111*b* pushes the inner end surface of the restraint pin 114 to allow the restraint pin 114 to project outward from the outer surface of the right side plate 60.

Figure 19:
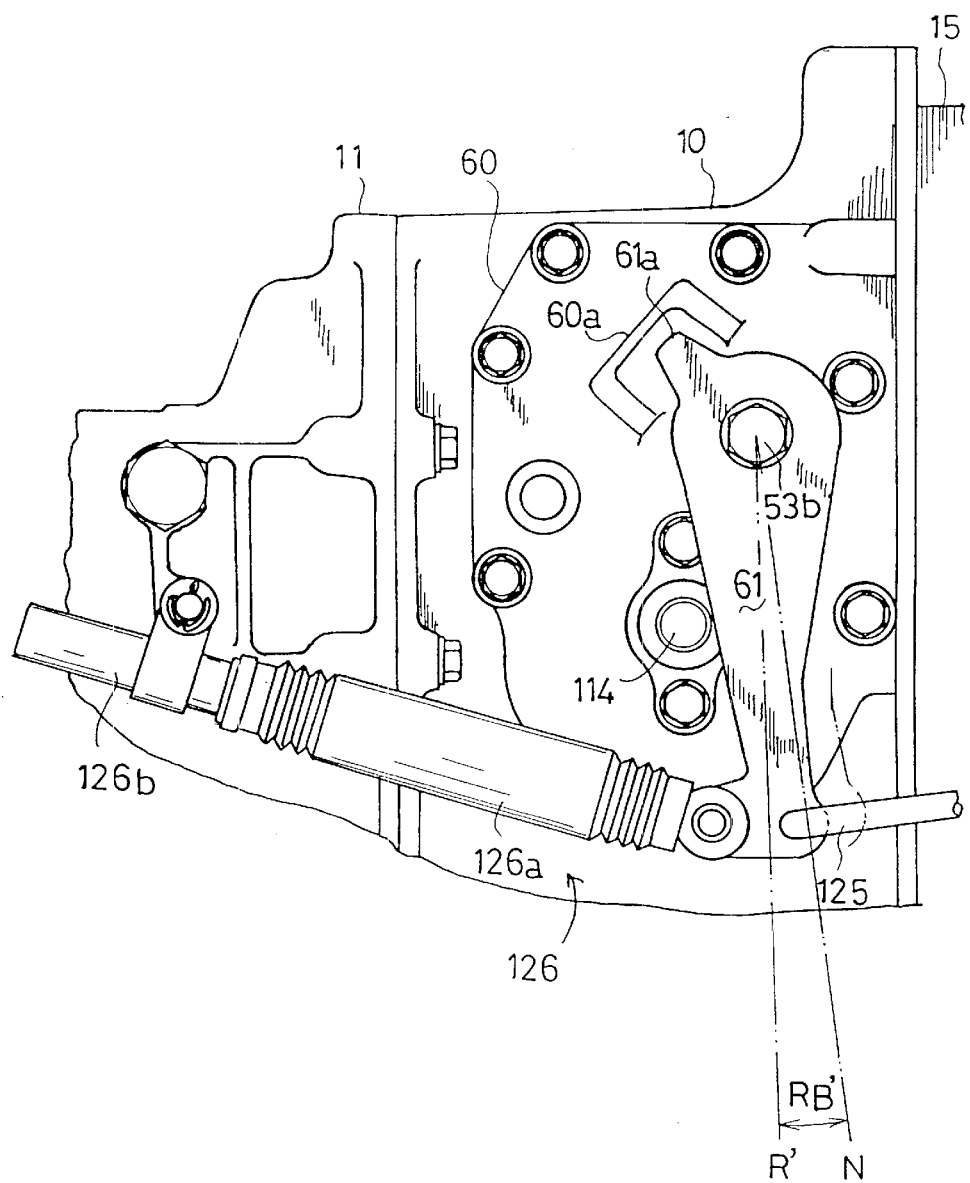
FIG. 19 is an elevational view showing the restraint mechanism when the speed change arm is regulating rearward acceleration.

Accordingly, when the speed control arm 61 is intended to rotate toward the rearward movement side from the neutral position (refer to FIG. 17) and reaches a substantially intermediate portion of the rearward movement side rotation range as shown in FIG. 19, one side surface of speed control arm 61 contacts with the outer periphery of the restraint pin 114. Thus, rearward side speed change rotation (RB') is restricted and acceleration limited. In brief, when the sub-speed-change lever 7 is switched to the high speed side and the rearward running pedal 8R is trod, the vehicle body rearwardly moves at high speed, which is inconvenient for use. Therefore, the restraint pin 114 automatically cuts the useless high speed rearward movement. The rearward acceleration is performable over the entire rotation range (RB) of the speed control arm 61 only if the sub-speed-change lever 7 is turned toward the low speed side.

Next, explanation will be given on the power transmission mechanism for driving the front wheels. As shown in FIGS. 2, 3, 4, 5, and 7, a gear 71, fixed to the front end of the third running transmission shaft 43, permanently engages a gear 70 which is rotatably fitted to the front end of the second running transmission shaft 42. The gear 70 permanently also engaging with a gear 72 fixed onto a running power take-out shaft 44 (refer to FIGS. 3, 5 and 7). A front wheel driving shaft 13, which is rotatably supported onto the front wall 10*a* through a bearing, and the running power takeout shaft 44, which is rotatably supported to the rear wall 10*b* through a bearing, are coaxially fitted at the front end of power takeout shaft 44 and the rear end of the front wheel driving shaft 13 in the first chamber R1.

A clutch mechanism C, for engaging and disengaging the front wheel drive is provided between the front end of the running power take-out shaft 44 and the rear end of the front wheel driving shaft 13. In detail, splines are formed on the outer periphery of the front end of the running power take-out shaft 44 and on the outer periphery of the rear end of the driving shaft 13. On the splines at the rear end of the front wheel driving shaft 13 is fitted a clutch slider 73 not relatively rotatably and axially slidable. As shown in FIG. 8, an annular grove 73*a* is formed at the outer periphery of clutch slider 73. The shift arm 74, at the lower end is retained by the annular groove 73*a*, and, at the upper end, is fixed to the inner end of a shifter shaft 75. The shifter shaft 75 is pivoted onto the left side plate 77, which closes an opening formed on the outer surface of the left side wall of the front casing. Fixed at the outer end of the shifter shaft 75 is an on-off operating arm 76. Operating arm 76, thus, is connected to the side of the transmission opposite to the speed control arm 61. The on-off arm 76 is, in turn, connected to a front wheel driving on-off lever (not shown) provided on a driver's cab through a link or the like. Therefore, the speed control arm 61 and operating arm 76, which are disposed opposite to each other with respect to the housing, can easily interlock with the speed change operating member and the front wheel on-off operating member in the cab without any interference. In addition, a ball detent mechanism is provided between the clutch slider 73 and the front wheel driving shaft 13 for enabling the clutch slider 73 to be held in the positions of "4WD" and "2WD" respectively.

In such construction, when the on-off operating arm 76 is turned to the "4WD" position, the clutch slider 73 couples the front wheel driving shaft 13 with the running power takeout shaft 44. Consequently, the power from the third running transmission shaft 43 is transmitted through the gear 71, to freely fitted gear 70, to gear 72, to running power takeout shaft 44, to slider 73, to front wheel driving shaft 13, to universal joint 17, to input shaft 19, to front axle casing 18 to drive the front wheels 20. Simultaneously, the third running transmission shaft 43 drives the rear wheels 21 through the differential gear unit D, so that the vehicle is driven by four wheel drive (4WD). When the on-off operating arm 76 is turned to the "2WD" position, the clutch slider 73 disconnects the running power takeout shaft 44 from the first wheel driving shaft 13, thereby performing two wheel drive (2WD) only.

As mentioned above, since the front wheel driving shaft 13 is rotatably supported in the first chamber R1 of the HST housing the front wheel driving shaft 13 can be supported longitudinally of the vehicle body regardless of the gear-type speed change unit and disposed substantially in the central position laterally of the vehicle body. Such construction facilitates transmission of power from the gear-type speed change unit to the front wheel driving shaft. In addition, no mater whether the gear speed unit—connected to the output shaft 45 of hydraulic motor M (as described above)—is set in a high or low position, the front and rear wheels will rotate synchronously.

The clutch mechanism C for engaging or disengaging the front wheel driving shaft 13 and/or running power takeout shaft 44—serving as the output portion of the gear-type speed change unit—can be housed in the lower space in the first chamber R1. The running power takeout shaft 44 is disposed coaxially and relatively rotatably with respect to the front wheel driving shaft 13. The respective shafts are journalled by the front wall 10*a* and rear wall 10*b*, constituting the first chamber R1, and the clutch mechanism C is interlocked between the abutting portion of both the shafts 13 and 44. Thus, the clutch mechanism can be constructed simply and compactly while effectively utilizing, the vacancy in the first camber R1.

Figure 6:
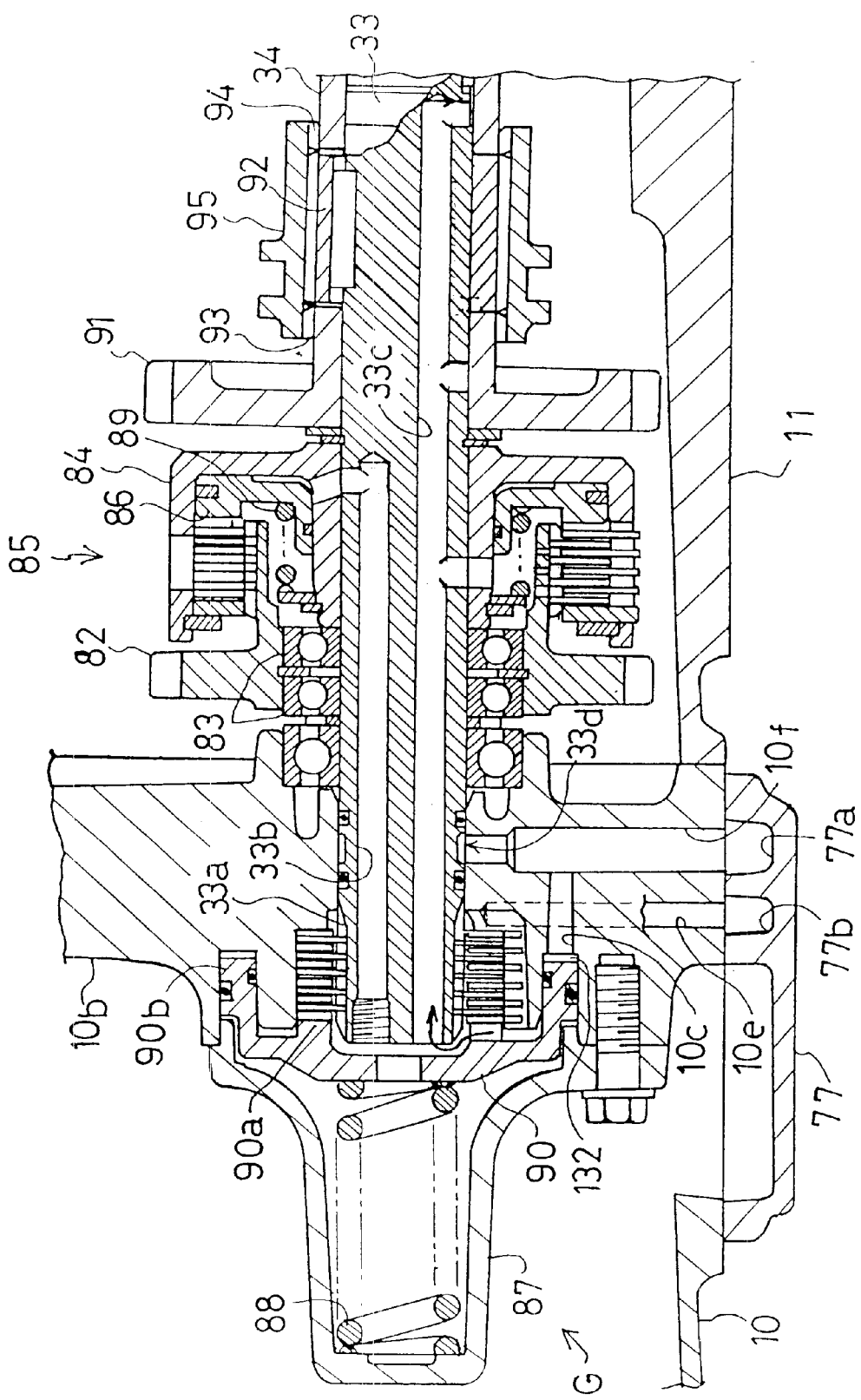
FIG. 6 is an enlarged cross-sectional view of a PTO brake and a PTO clutch mechanism.
Figure 7:
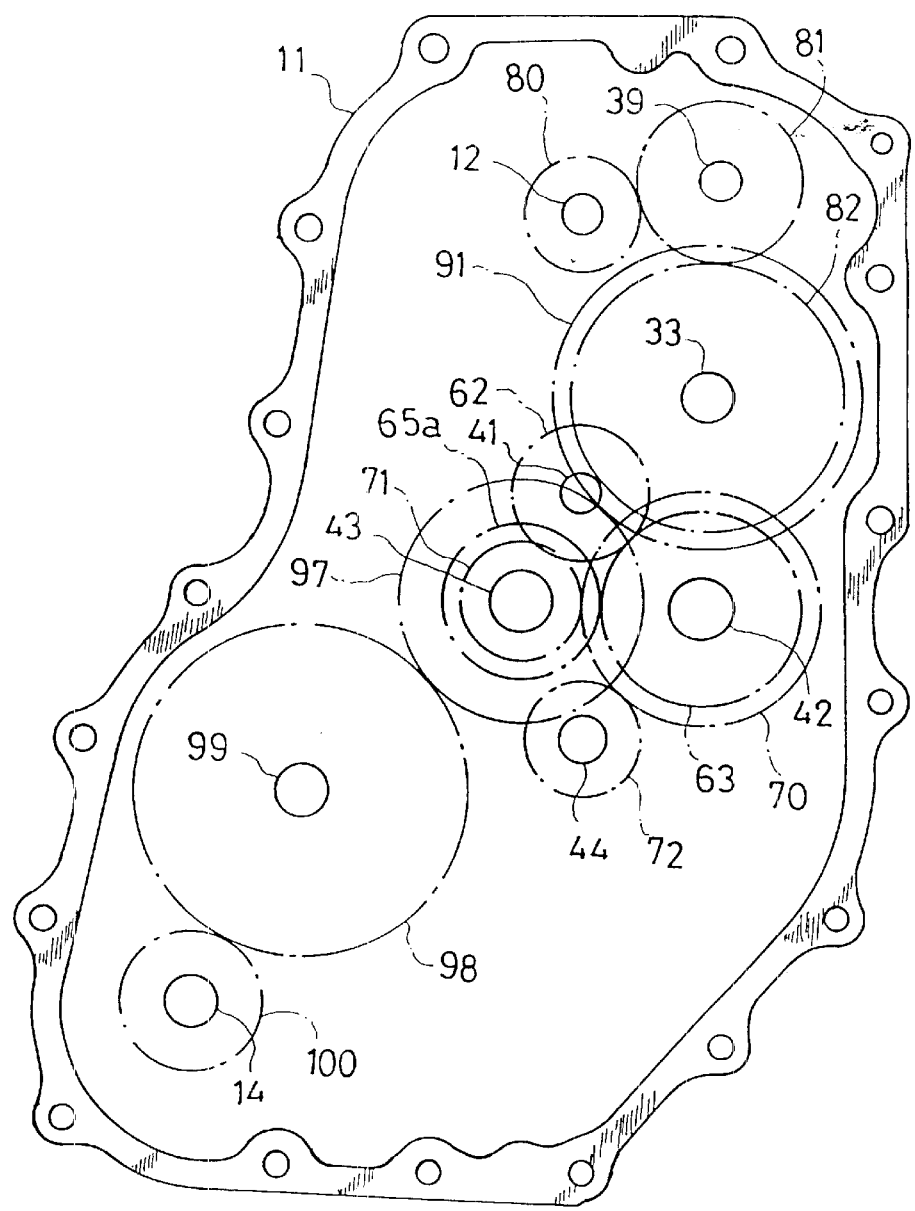
FIG. 7 is an elevational view showing the positional relationship between the running system and the PTO system.

Next, explanation will be given on the PTO transmission unit. As shown in FIGS. 2 and 5, the rear end of the input shaft 12 perforates through the rear wall 10*b* of the front casing 10 and fixes a gear 80. As shown in FIGS. 2, 5 and 6, the gear 80 engages with a gear 81, which is fixed onto the PTO counter shaft 39. The gear 81 engages with a freely fitted gear 82 rotatable through a bearing 83 on the PTO transmission shaft 33. The gear 82 is provided at the side surface with a boss. As enlarged in FIG. 6, between the boss and a clutch casing 84, which is fixed onto the PTO transmission shaft 33, are interposed a plurality of friction plates so as to construct a multi-friction plate type hydraulic PTO clutch means 85. The pistons 86 in the clutch casing 84, when slid by supply of oil pressure to be discussed below, brings the friction plates in press contact with each other, and allows the cam 82 to engage with the PTO transmission shaft 33 through the clutch casing 84, so that the power is adapted to be transmitted from the input shaft 12 to the PTO transmission shaft 33. In addition, reference numeral 89 designates a spring for biasing the piston 86 in the direction of releasing the biased friction plates.

Figure 21:
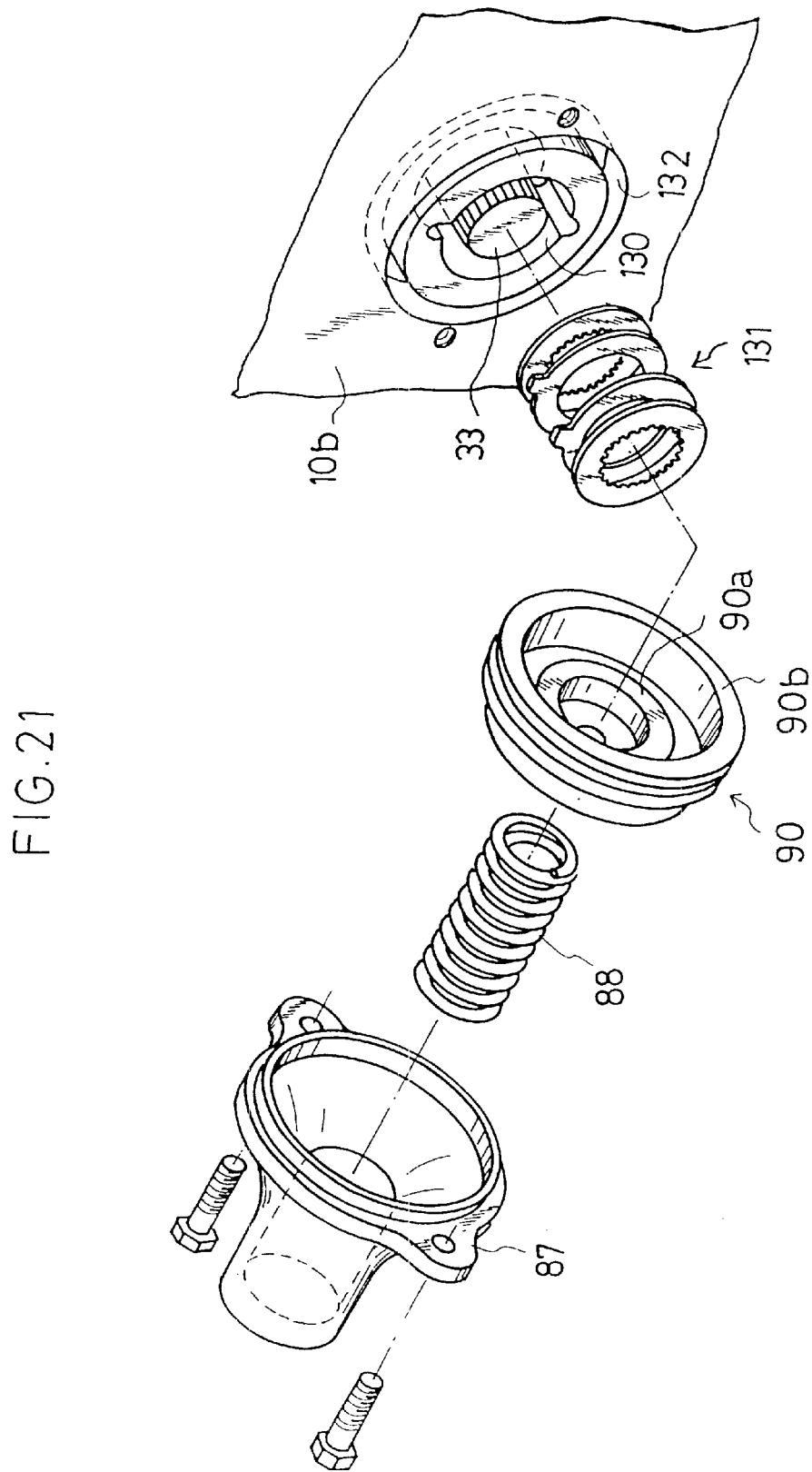
FIG. 21 is an exploded view of a PTO brake.

The PTO transmission shaft 33 projects at the front end thereof through the rear wall 10b of the front casing 10 and is positioned in the first chamber R1. A PTO brake G is constructed therein so as to effectively use the vacancy in the first chamber R1. The PTO brake G, as shown in FIGS. 6 and 21, forms splines 33a on the outer periphery of the front end of PTO transmission shaft 33 and retains the rotary plates into the splines 33a. A recessed brake chamber 130 is formed on the front surface of the rear wall 10b of front casing 10. On the inner periphery of the recessed brake chamber 130, fixed plates are non-rotatably retained. The fixed plates and rotary plates are alternately put in layers so as to form a braking friction member 131 which is disposed in the brake chamber 130. A pressure plate is disposed to one side of the braking friction member 131.

The brake chamber 130, which is formed in a recessed portion at one side surface of the rear wall 10b of the front casing 10 for partitioning the first chamber R1 from the second chamber R2, does not need to be separate from the housing. Moreover, because, the braking friction member 131 is contained in the brake chamber 130 and biased by the pressure plate 90, the PTO brake G can be small in size. Therefore, the space it occupies in the interior of the first chamber R1 can be diminished.

The pressure plate 90 is disc-like in shape. At the center of the rear surface of pressure plate 90 is a biasing portion 90a projecting toward the braking friction member 131. Coaxially projecting from the annular portion of pressure plate 90 is and an annular piston portion 90b which extends in the same direction as the biasing portion 90a. The piston portion 90b is larger in diameter than the braking friction member 131 and slidably fitted into a cylinder chamber 132 of an annular recess at the outer periphery of the brake chamber 130 on the front surface of the rear wall 10b and positioned on the outer periphery of the braking friction member 131. Thus, the pressure plate 90, which consists of the annular piston portion 90b at the outer periphery, and the biasing portion 90a at the central portion, is made smaller in axial length. Thus, the entire length of the PTO brake G is reduced so that the pressure plate 90 can reasonably be housed in a restricted space in the first chamber R1. A bell-shaped cover 87 is mounted on the front surface of the rear wall 10b of the front casing 10 to cover the pressure plate 90. A coil spring 88 housed in a narrow, elongated portion of the cover 87 abuts at the base end against the inner bottom surface of the cover 87 and at the action end against the surface of the pressure plate 90. Therefore, the pressure plate 90 is biased in the direction of biasing the braking friction member 131 and within the cover 87.

Oil passages 33b and 33c are bored in the PTO transmission shaft 33. The oil passage 33b opens at one end into the cylinder chamber of the clutch chamber 84 of the PTO clutch means 85 which houses the pistons 86. At the other end of oil passage 33b, it communicates with a rotary joint. The rotary joint connects an annular groove 33d, which is formed on the outer periphery of the axial end of the PTO transmission shaft 33, to the inner peripheral surface of a through bore, which is in slidable contact with the groove 33d at the rear wall 10b. An oil passage 10f is bored at the rear wall 10b of the front casing 10 along the thick portion thereof and communicates at one end with the rotary joint and is open at the other end on the left side surface of the first casing 10. An oil passage 10c, communicating at one end with the cylinder chamber 132 of the PTO brake G, is bored in the thick portion of the rear wall 10b and perpendicularly communicates at the other end with the oil passage 10f.

The oil passage 33c in the PTO transmission shaft 33 is open at one end on the front end surface of the PTO transmission 33 shaft and communicates with interior of the brake chamber 130 of the PTO brake G and closed by the cover 87. An oil passage 10e is bored in the thick portion of the rear wall 10b and communicates at one end with the brake chamber 130 and is open at the other end on the left side surface of the front casing 10.

Thus, the operating oil for the PTO clutch means 85 and the PTO brake G can be discharged from the oil passages 10f and 10e formed at the rear wall 10b through the PTO transmission shaft 33 positioned therein. Consequently, the total length of the oil passages is reduced and the conduit resistance is diminished. As a result, the PTO brake G can reliably and quickly be exerted.

Figure 13:
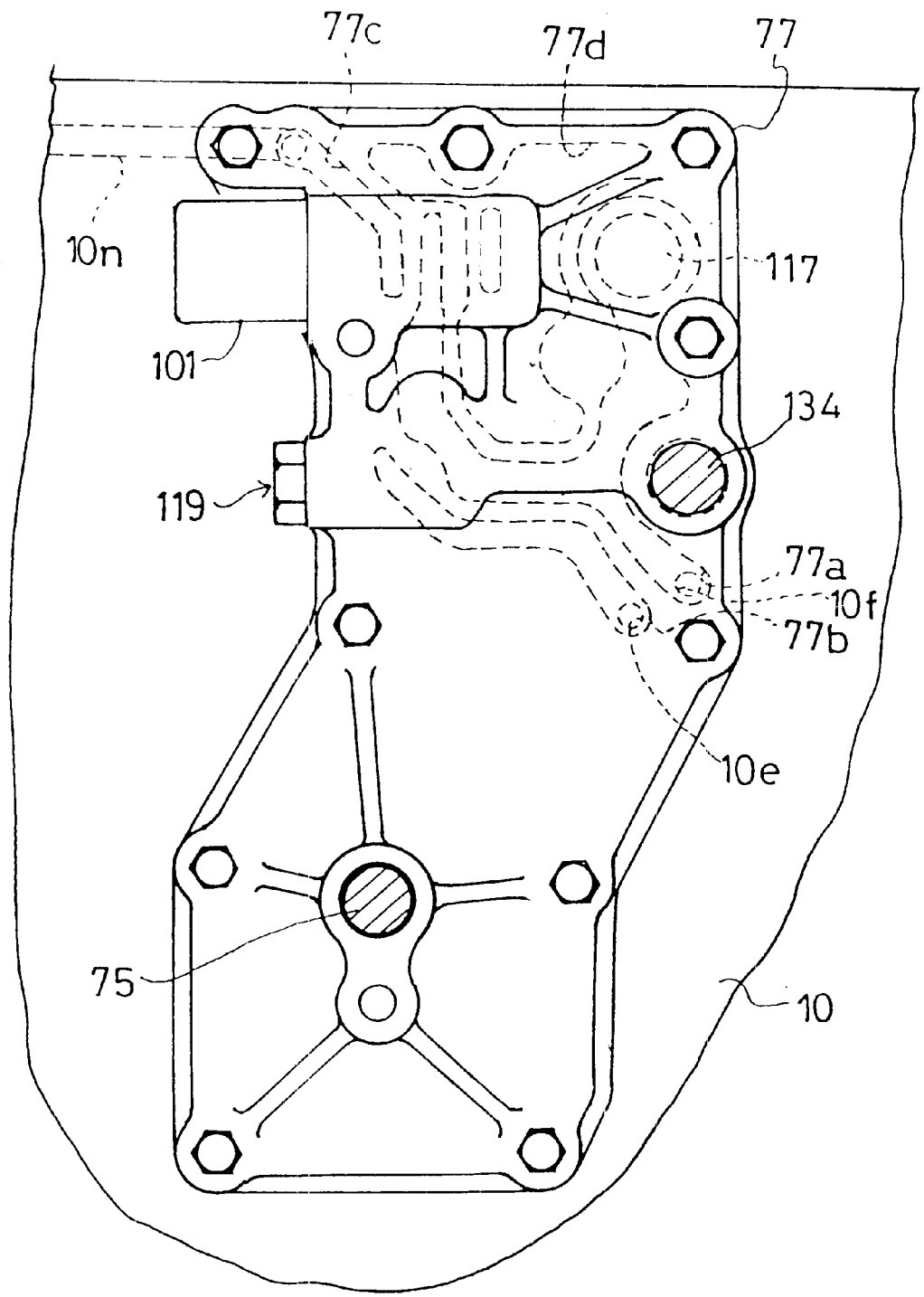
FIG. 13 is an elevational view showing a side plate and the ambient portion thereof.
Figure 14:
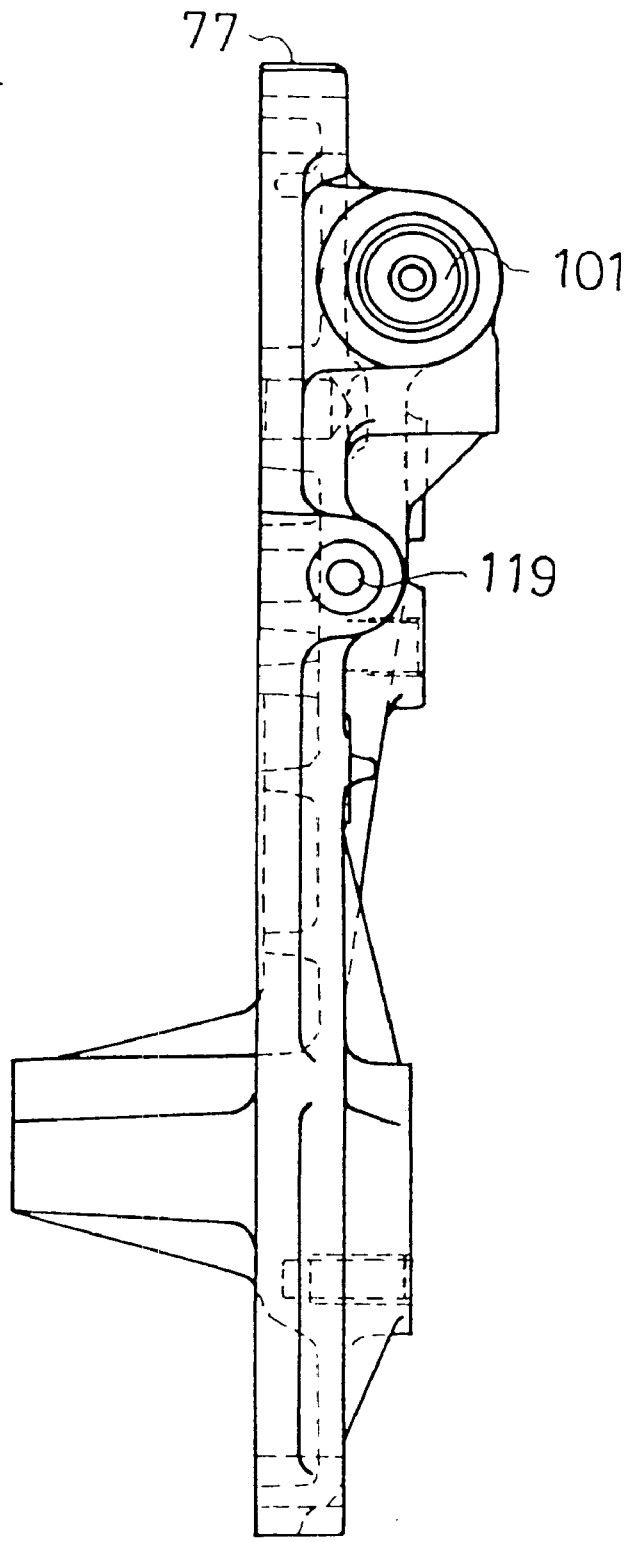
FIG. 14 is a side view of the side plate.
Figure 15:
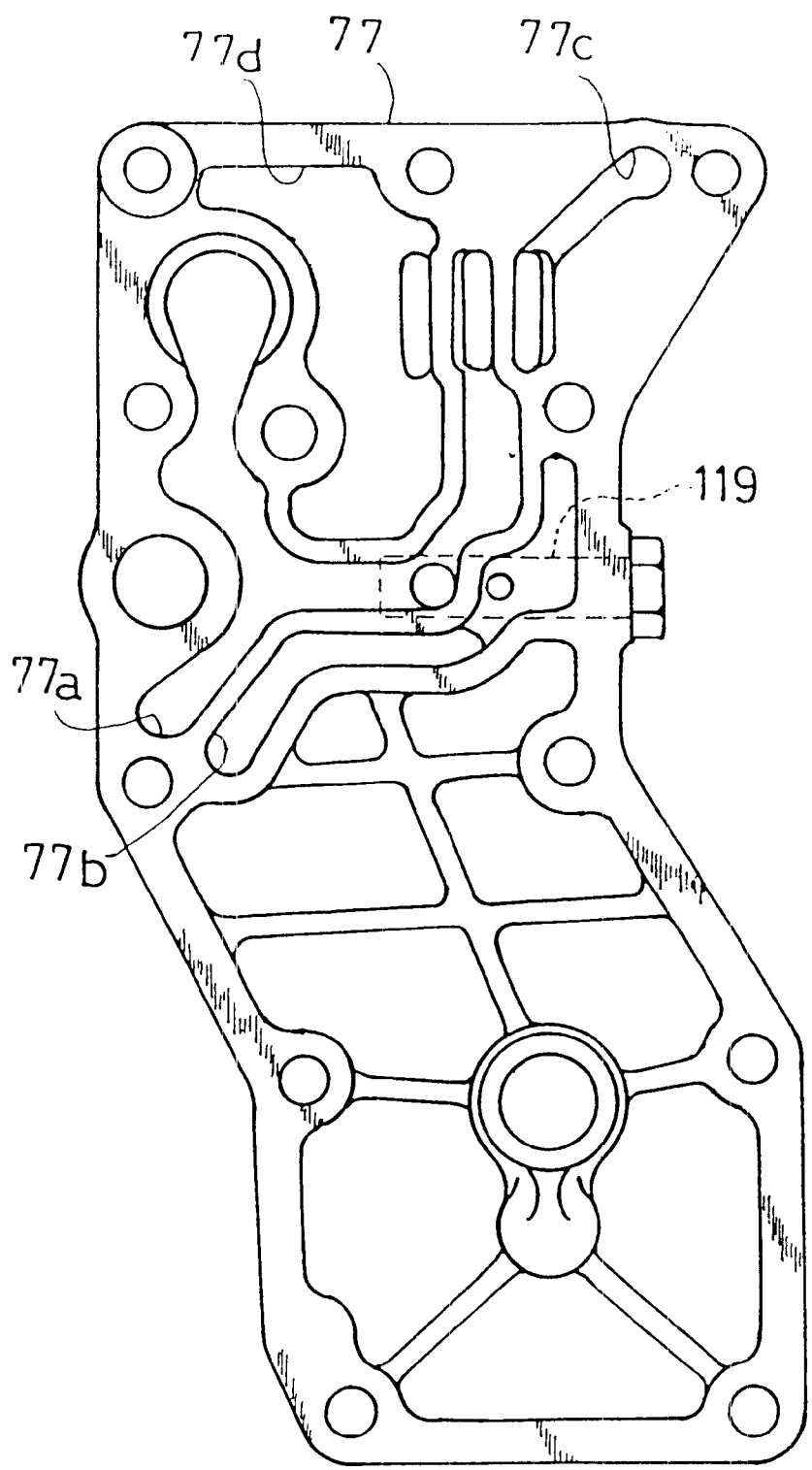
FIG. 15 is a rear view of the same.

FIGS. 13, 14 and 15 show the construction of a left side plate 77, which is mounted on the outer surface of the left side wall of the front casing 10. The shifter shaft 75 and switching shaft 134 are pivotally supported onto the left side plate 77. Also on left side plate 77 is disposed a cylindrical PTO clutch/brake control valve 101, for alternately switching the PTO clutch 85 in "connection or disconnection." As shown in FIGS. 13 and 15, four oil grooves 77a, 77b, 77c and 77d, are channeled through the surface of the left side plate 77 which abuts the front casing 10. When the left side plate 77 is mounted onto the left side surface of the front casing 10, these oil grooves 77a, 77b, 77c and 77d form oil passages, wherein: the oil groove 77c communicates with a pump port of the PTO clutch/brake control valve 101; the oil groove 77a communicates with a clutch port thereof; and the oil grooves 77a and 77b communicate with each other through a relief valve 119 mounted into the left side plate 77. As a result, the oil flowing in the oil groove 77a is adjusted in pressure to a specified value by the relief valve 119, and relief oil discharged from the relief valve 119 is adapted to flow in the oil groove 77b.

The left side plate 77 covers the oil passage 10e and 10f, which are open on the outer surface of the left side plate of the front casing 10. The left side plate 77 lines up to allow the oil groove 77a to communicate at one end with the oil passage 10f, and the oil groove 77b with the oil passage 10e. Also, the oil groove 77d communicates with a drain port of the PTO clutch/brake control valve 101 and also with an oil sump within the front casing 10 through a drain bore 10m (refer to FIG. 22) open at the outer surface of the left side wall of the front casing 10. Furthermore, the oil groove 77a, as shown in the right half of FIG. 10 and in FIG. 22, connects with an accumulator 117, which can control pressure oil flowing from the oil groove 77a to the rotary joint so as to slowly connect the PTO clutch means 85, thereby enabling a working machine of a large amount of inertia to be properly driven without shock.

The accumulator is constructed as follows: a cylinder chamber 10d is bore into the thick portion of the rear wall 10b of the front casing 10, perpendicularly to the input shaft 12; a spring 117b and a piston 117a are inserted into the cylinder chamber 10d; the left side plate 77 covers the head of the piston 117a, and a pressured chamber is formed between the head and the left side plate 77 to communicate with the oil groove 77a. Hence, a casing for the accumulator utilizes part of the housing which, in turn, simplifies its construction and allows for a low manufacturing cost. Also, the PTO clutch/brake valve 101 and accumulator 117 are connected simultaneously with the mounting of left side plate 77, thereby enabling the assembly thereof to be simplified. In addition, the cylinder chamber 10d communicates at the spring housing side with a bearing chamber 10j for the input shaft 12 so that oil having leaked to the spring containing side lubricates the bearing in the bearing chamber 10j of the input shaft 12.

The PTO clutch brake control valve 101 comprises a 3-port 2-position directional control type solenoid valve. A pump port thereof communicates through the oil groove 77c with one end of the oil passage 10n (refer to FIGS. 8 and 11) which extends forward along the thick portion of the left side wall of front casing 10. An oil passage 10n communicates at the other end with the drain port of the pressure reducing valve 49 housed in the pump casing 105. This communication is through a perforating bore (not shown), which is formed at the center section mounted to the front casing 10. As a result oil discharged from the valve 49 is guided into the oil passage 10n. The PTO clutch/brake control valve 101 can alternatively switch a PTO changeover switch (not shown) provided on a dash board 2 to an "engaging position" or "disengaging position" by the ON-OFF operation of the operator. When the PTO clutch/brake control valve 101 is put in "the disengaging position", the state is as shown in FIG. 12. In this position, the oil passages 77a and 77c communicate with the oil groove 77d, so that the oil passages 10n, 10f and 10e—connecting, respectively, with the drain port of the pressure reducing valve 49, the cylinder chamber of the PTO clutch means 85 and the cylinder chamber 132 of the PTO brake G, are open so that pressurized oil drains through bore 10m and into an oil sump in the front casing 10 from the oil groove 77d. Hence, since the piston 86 of the PTO clutch means 85 is biased by the spring 89 to move away from the friction plate, the clutch means 85 disconnects to cut off the power transmission to the PTO transmission shaft 33. Meanwhile, the coil spring 88 of the PTO brake G biases the biasing portion 90a of the pressure plate 90 so as to bias the braking friction member 131 to brake the PTO transmission shaft 33, thereby quickly stopping inertia rotation and together rotation of the mid-PTO shaft 14 and rear PTO shaft 36, to be discussed below.

When the PTO clutch brake control valve 101 is put in the "engaging position", the oil groove 77c communicates with the oil groove 77a and the oil groove 77d is blocked. Hence, pressurized oil flowing in the drain port of the pressure reducing valve 49, flows into the cylinder chamber of the PTO clutch means 85 through the oil passage 10f at the rear wall 10b of the front casing 10, the rotary joint and the oil passage in the PTO transmission shaft 33. As a result, the piston 86 biases the friction plate to connect the PTO clutch means 85, which transmits the rotation of input shaft 12 to the PTO transmission shaft 33. On the other hand, the oil pressure, flowing in the oil passage 10f, branches to flow into the oil passage 10c and into the cylinder chamber 132 of the PTO brake G so as to move the pressure plate 90 away from the braking friction members 131 against the coil spring 88, thereby releasing the braking action to the PTO transmission shaft 33. In addition, the relief oil, produced when the oil pressure flowing in the oil groove 77a is adjusted by the relief valve 119, flows into the oil groove 77a to lubricate the braking friction member 131. It then flows into the oil passage 33c from the front end surface of the PTO transmission shaft 33 to lubricate the friction plate of PTO clutch means 85 and the respective lubricated portions, and thereafter is returned to the oil sump in the rear casing 11.

Figure 16:
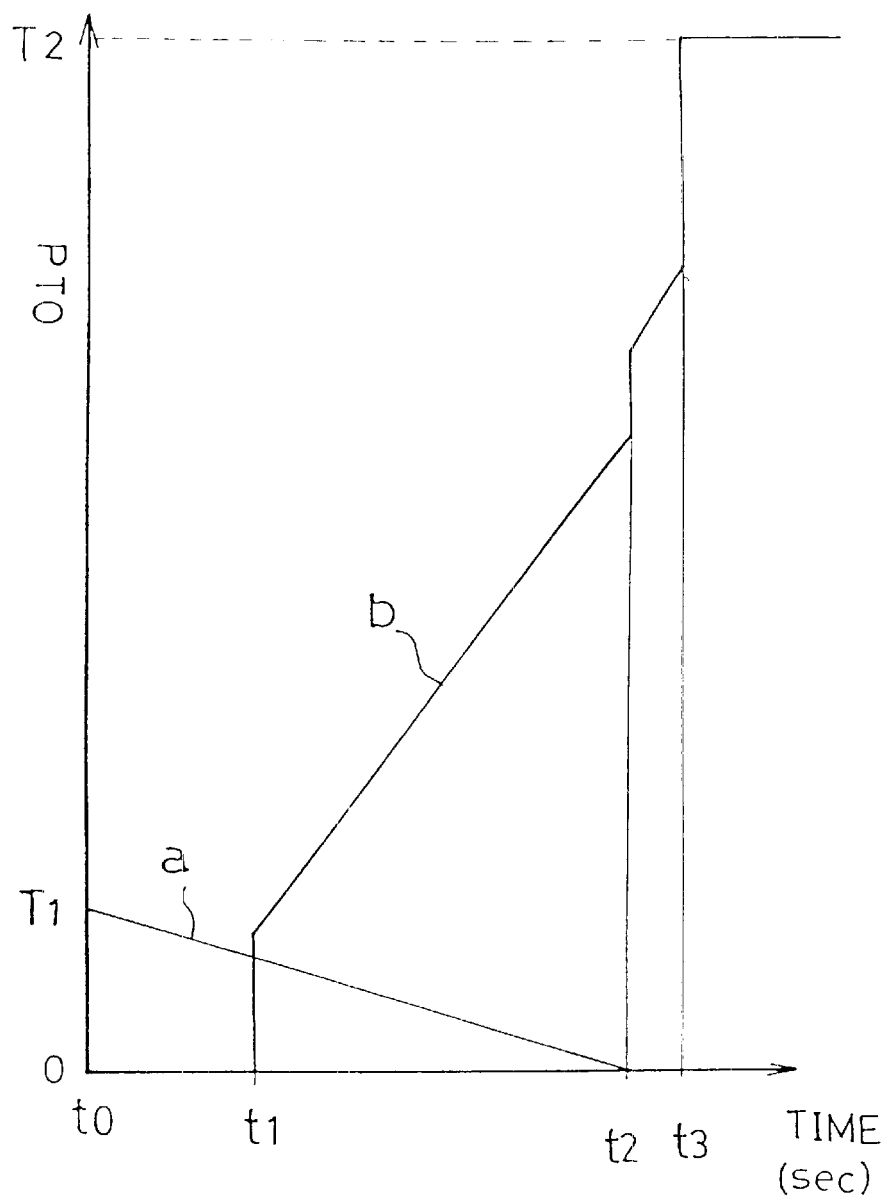
FIG. 16 is a graph showing the relation between the shaft torque acting on a PTO transmission shaft and time.
Figure 17:
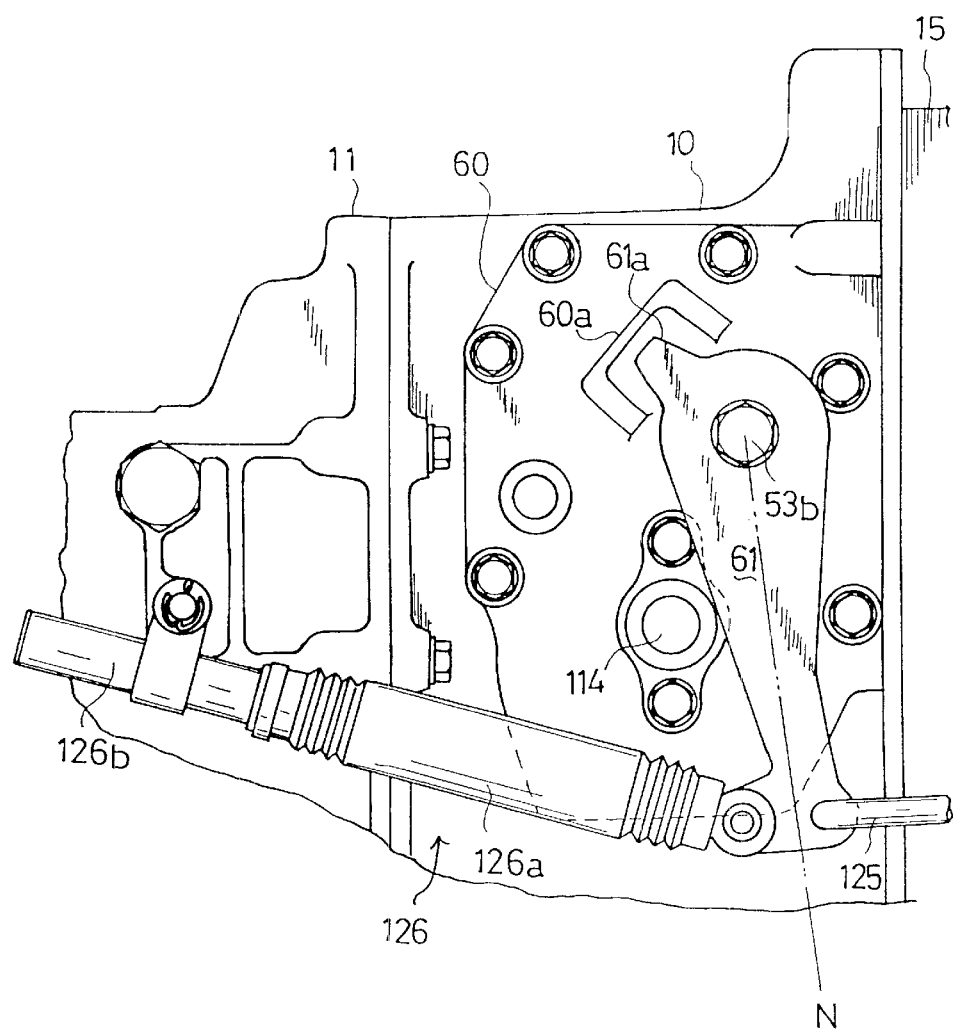
FIG. 17 is an elevational view showing a restraint mechanism when a speed control arm is in a neutral position.

The relation between the shaft torque and the time is shown in the graph in FIG. 16. Curve (a) measures the brake torque for braking the PTO 25 transmission shaft 33 by the brake G against time, and curve (b) measures the transmission torque at the PTO transmission shaft 33 against time. Before the PTO change-over switch is put in the "not engaged position," at a time (t0), the brake torque, corresponding to a torque value (T1), acts on the PTO transmission shaft 33. When the PTO change-over switch is switched to the "engaged position," the pressure plate 90 of the PTO brake G is given pressure to move in the direction of weakening the biasing force with respect to the rotary plate. As demonstrated by curve (a), the brake torque reduces uniformly with the lapse of time. Meanwhile, until a time (t1), the operating oil has not filled in the cylinder chamber of the piston 86 of the PTO clutch means 85 so as not to generate the transmission torque of the PTO transmission shaft 33. Thus, until the time (t1), the value of curve (b) along the vertical axis is zero. At the time (t1) the operating oil is filled in the cylinder chamber and a transmission torque generates in the PTO shaft 33. Thus, at time (t1) curve (b) increases to a positive value. During the time (t1) to (t2), the piston 117a of the accumulator 117 is displaced against the spring 117b to fill the operating oil into the cylinder chamber 10d; whereby the oil pressure, acting on the piston 86 of the PTO clutch means 85 reaches a level that causes the PTO clutch means 85 to be slowly connected while gradually rising the biasing force with respect to the friction plate, and the transmission torque gently rises. When the transmission torque reaches the time (t2), the piston 117a stops displacement. During the time (t2) to (t3), the piston 86 strongly pushes the friction plate against the biasing force of spring 89 of the PTO clutch means 85. Then, when it reaches the time (t3), the clutch means 85 perfectly connects to apply the set maximum transmission torque T2 to the PTO transmission shaft 33.

Next, explanation will be given on the driving system of the mid-PTO shaft 14 and rear PTO shaft 36. As best seen in FIGS. 5 and 6, a mid-PTO driving gear 91 is freely fitted onto an intermediate portion of the PTO transmission shaft 33. A hub 92 is fixed at the rear portion of the PTO transmission shaft 33. Behind hub 92 and coaxially freely fitted to the rear end of PTO transmission shaft 33 is a transmission shaft 34, which connects with the rear PTO transmission shaft 35. An engaging member 93 is formed on the side surface of the mid-PTO driving gear 91 and an engaging member 94 is formed on the front end of the transmission shaft 34. A clutch slider 95 is spline-coupled onto the hub 92 so that it is non-relatively rotatable and axially slidable. A shift fork (not shown) is retained by an annular recess formed on the outer periphery of the clutch slider 95 and fixed onto a shifter shaft 122 shown in FIG. 10. The shifter shaft 122 is longitudinally slidably mounted between the rear wall 10a of the front casing 10 and the partition 11a of the rear casing 11 and positioned at the front end in the first chamber R1. Meanwhile, a switching shaft, 134 is rotatably supported by the left side plate 77. An arm 133 is fixed to the inner end of the arm 134, and is retained at the front end to a groove of the shifter shaft 122. At the outer end of the switching shaft 134 is fixed a PTO switching arm 135, which is connected with a PTO switching lever 9 disposed at the side of the operator's cab through a link or the like. The mid-PTO driving gear 91, as shown in FIGS. 2 and 4, engages with an idle gear 97 freely rotatably fitted on the axially intermediate portion of the third running transmission shaft 43 through bearings 96. The idle gear 97 engages with a gear 98 fixed onto the counter shaft 99, and the gear 98 engages with a gear 100 fixed to the mid-PTO shaft 14, so that power is transmitted from the mid-PTO driving gear 91 to the mid-PTO shaft 14. Thus, a PTO transmission gear train comprising the mid-PTO driving gear 91, idle gear 97, gear 98 and gear 100, for transmitting the power to the mid-PTO shaft 14, is housed in the second chamber R2 and is made compact in construction because the idle gear 97 is disposed on one of shafts constituting the gear-type speed change unit.

Accordingly, the PTO switching lever 9 disposed at the side of the operator's cab is operated to allow the slider 95 to slide rearwardly in the drawing plane of FIG. 6. When slid rearward, the slider 95 connects the hub 92 with the engaging member 94 on the transmission shaft 34. As a result, power passing through the PTO clutch means 85 is transmitted in the following order: from the PTO transmission shaft 33, to hub 92, to clutch slider 95, to engaging member 94, to transmission shaft 34, and to rear PTO driving shaft 35, thereby driving the rear PTO shaft 36. When the clutch slider 95 is slidably moved forwardly by one step, the clutch slider 95 connects both the engaging member 93 of the mid-PTO driving gear 91 and the engaging member 94 of the transmission shaft 34 with the hub 92. Therefore, power is transmitted to the rear PTO shaft 36, as well as to the following in order: the PTO transmission shaft 33, to hub 92, to clutch slider 95, to engaging member 93, and to mid-PTO driving gear 91, so as to drive the mid-PTO shaft 14 through the PTO transmission gear train. Consequently, both the mid-PTO shaft 14 and rear PTO shaft 36 can be driven. Furthermore, the clutch slider 95, when slid to the forwardmost position, connects only the engaging member 93 of the mid-PTO driving gear 91 to the hub 92. Thus, the power is transmitted, in order, to the PTO transmission shaft 33 to hub 92, to clutch slider 95, to engaging member 93, and to mid-PTO driving gear 91, so as to drive the mid-PTO shaft 14 only.

Figure 23:
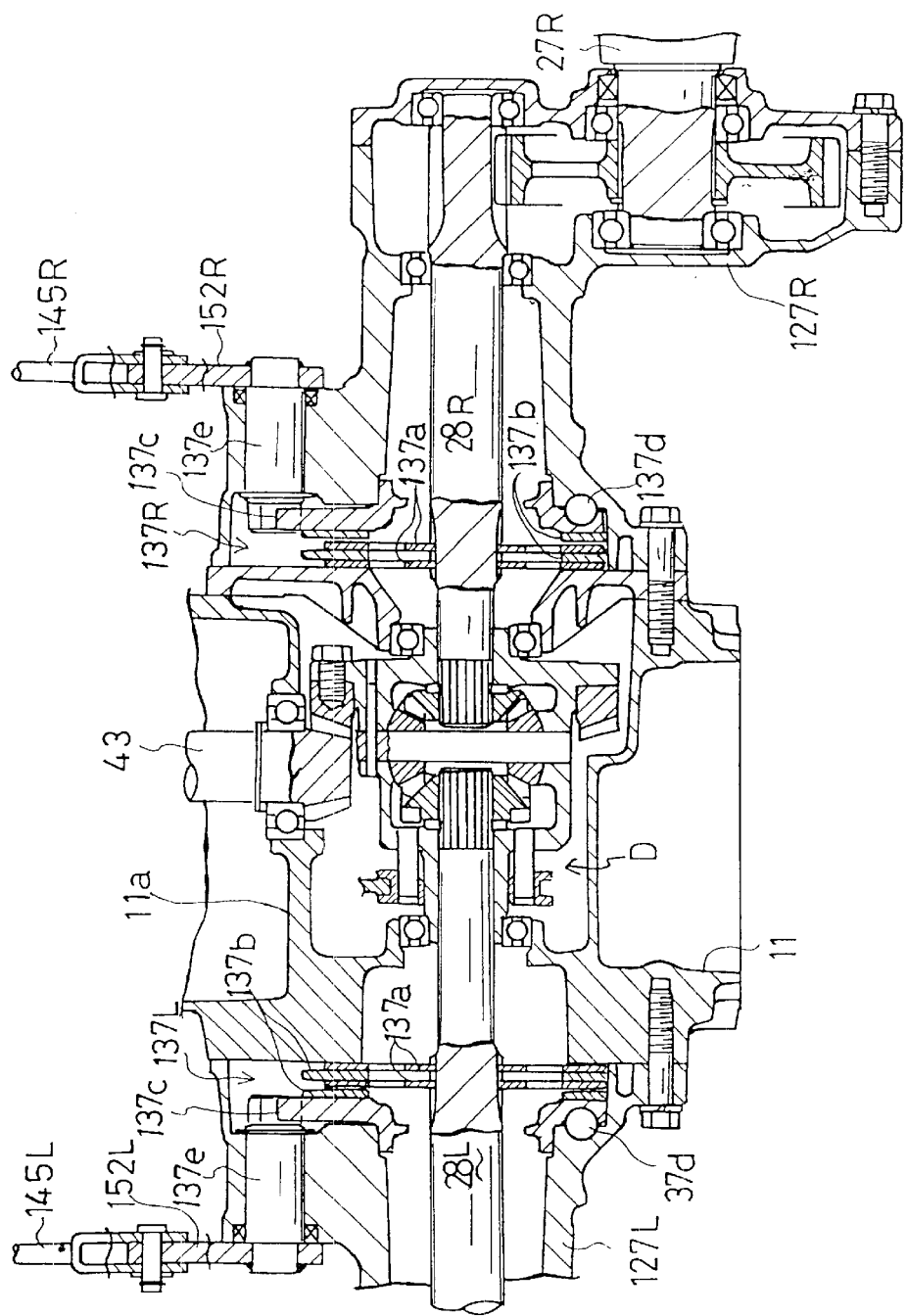
FIG. 23 is a cross sectional view of a rear portion of a rear casing and a rear axle casing.

A differential gear unit D, housed in the third chamber R3 in the rear casing 11, as shown in FIG. 23, engages through a bevel gear with the output shaft 43 of the gear-type speed changing unit at the protecting portion thereof from the partition 11a. The differential gear unit D has differential yoke shafts 28L and 28R leftwardly and rightwardly extending therefrom. The differential yoke shafts 28L and 28R are pivotally supported in the rear axle casing 127L and 127R, and connected at the ends with the rear axles 27L and 27R through the reduction gear train, respectively.

Within the rear axle casings 127L and 127R are housed running brake units 137L and 137R for braking the rear axles 27L and 27R. In detail, the differential yoke shafts 28L and 28R are spline engaged with the inner peripheral ends of a plurality of rotation side friction plates 137a. The fixed side friction plates 137b, which contact in layers with the rotation side friction plates 137a, are non-rotatably retained at the outer peripheral ends to the inner periphery of openings at the rear axle casings 127L and 127R. At one end of the side surface of each outermost fixed side friction plate 137b is disposed each ring-like-shaped pressure plate 137c, and between the side surface of the pressure plates 137c and the side surface of the rear axle casings 127L and 127R are disposed cam means 137d for generating axial thrust at the pressure plate 137c.

Brake operating shafts 137e are pivotally supported to each rear axle casings 127L and 127R. At the inner end of each brake operating shaft 137e is formed a cam surface to abut against a projection of each pressure plate 137. At the outer end of the brake operating shafts 137a are fixed brake arms 152L and 152R, which connect with left and right brake pedals 7L and 7R, respectively. When brake operating shafts 137e are rotated by the brake arms 152L ans 152R, the cam surfaces rotate the pressure plate 137c around the differential yoke shafts 28L and 28R through the aforesaid projections, and the thrust generating cam means 137d act to allow the pressure plate 137c to bias the friction plates 137a and 137b. Thus, the running brake units 137L and 137B are actuated to exert the braking action onto the differential yoke shafts 28L and 28B, which in turn apply the braking action to the rear axles 27L and 27R.

Next, explanation will be given on a brake operating mechanism, in which on the left side step 4 of the vehicle body frame 15 are juxtaposed a left turn brake pedal 7L and a right turn pedal 7R. On the right sidestep 4 are juxtaposed a forward running pedal 8F and a rearward running pedal 8R. A master brake pedal 136 having a wide pedal face is disposed in front of and slightly above both the pedals 8F and 8R.

Figure 24:
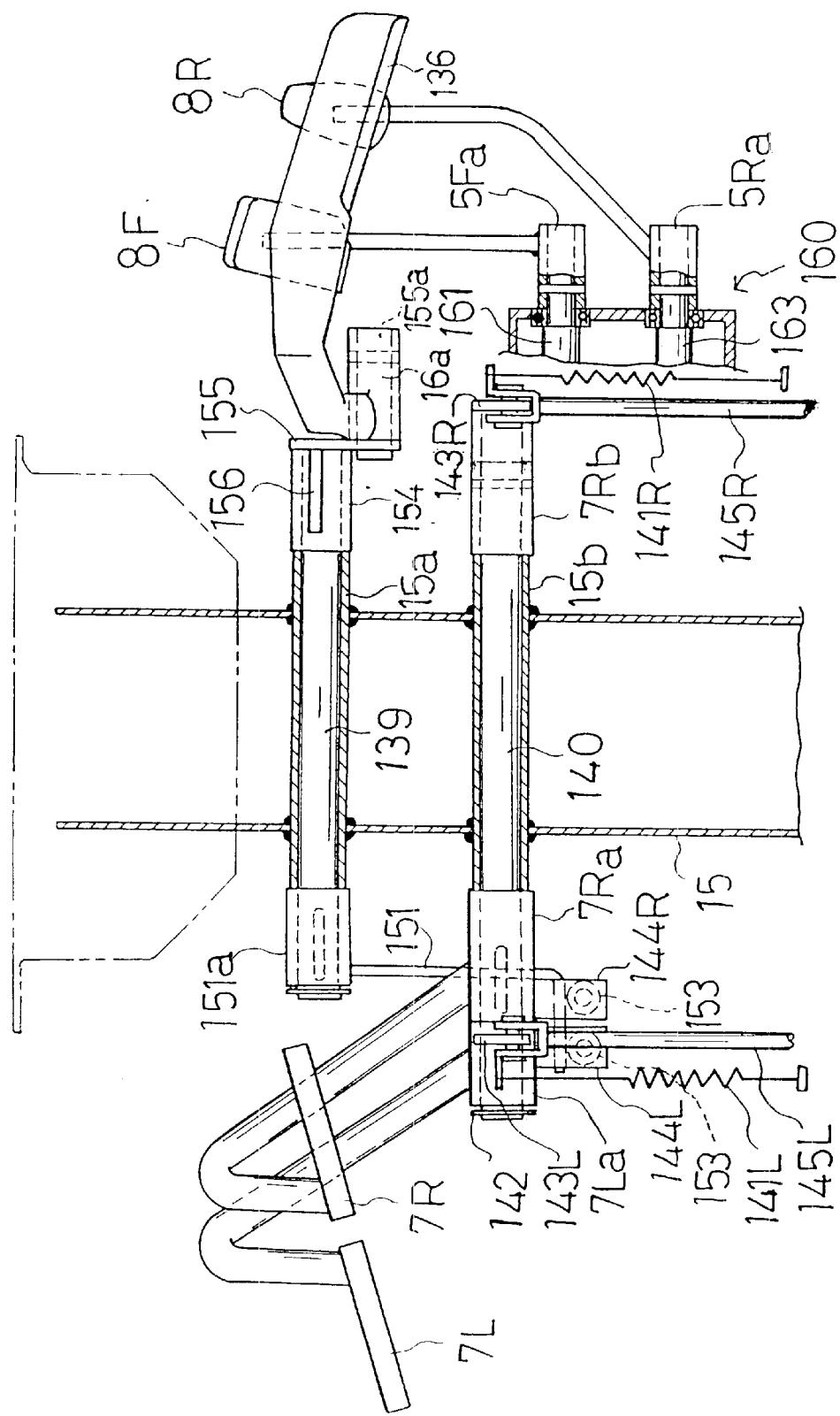
FIG. 24 is a cross-sectional plan view of a vehicle body frame supporting first and second brake pedal shafts.

As shown in FIG. 24, on the vehicle body frame 15, two support pipes 15a and 15b laterally extending are fixed longitudinally of the body frame 15 and in parallel to each other. Within the support pipe 15a, a first brake pedal shaft 139 is rotatably supported. Brake pedal shaft 139 is longer than the support pipe 15a and therefore projects out both ends of support pipe 15a. Within the support pipe 15b is rotatably supported a second brake pedal shaft 140, which is likewise longer than support pipe 15b and therefore projects from both ends of support pipe 15b. At the left end of the second brake pedal 140 are juxtaposed a cylindrical members 7La and 7Ra. Affixed on cylindrical member 7La is a left turn brake pedal 7L and affixed on cylindrical member 7Ra is a right turn brake pedal 7R. Both the cylindrical members 7La and 7Ra are locked onto the second brake pedal shaft 140 by a snap ring 142. The left turn brake pedal 7L and right turn brake pedal 7R project forwardly and upwardly at a slant forming a U-like bend, so that the pedal faces are positioned on the same plane with each other. The cylinder member 7La is relatively rotatably fitted and has on the outer periphery, an arm 143L and an abutting segment 144L which radially project from the cylinder member 7La. A link 145L is connected at the one end with the arm 143L and at the other end with a brake arm 152L of the brake unit 137L, as shown in FIG. 23.

Figure 27:
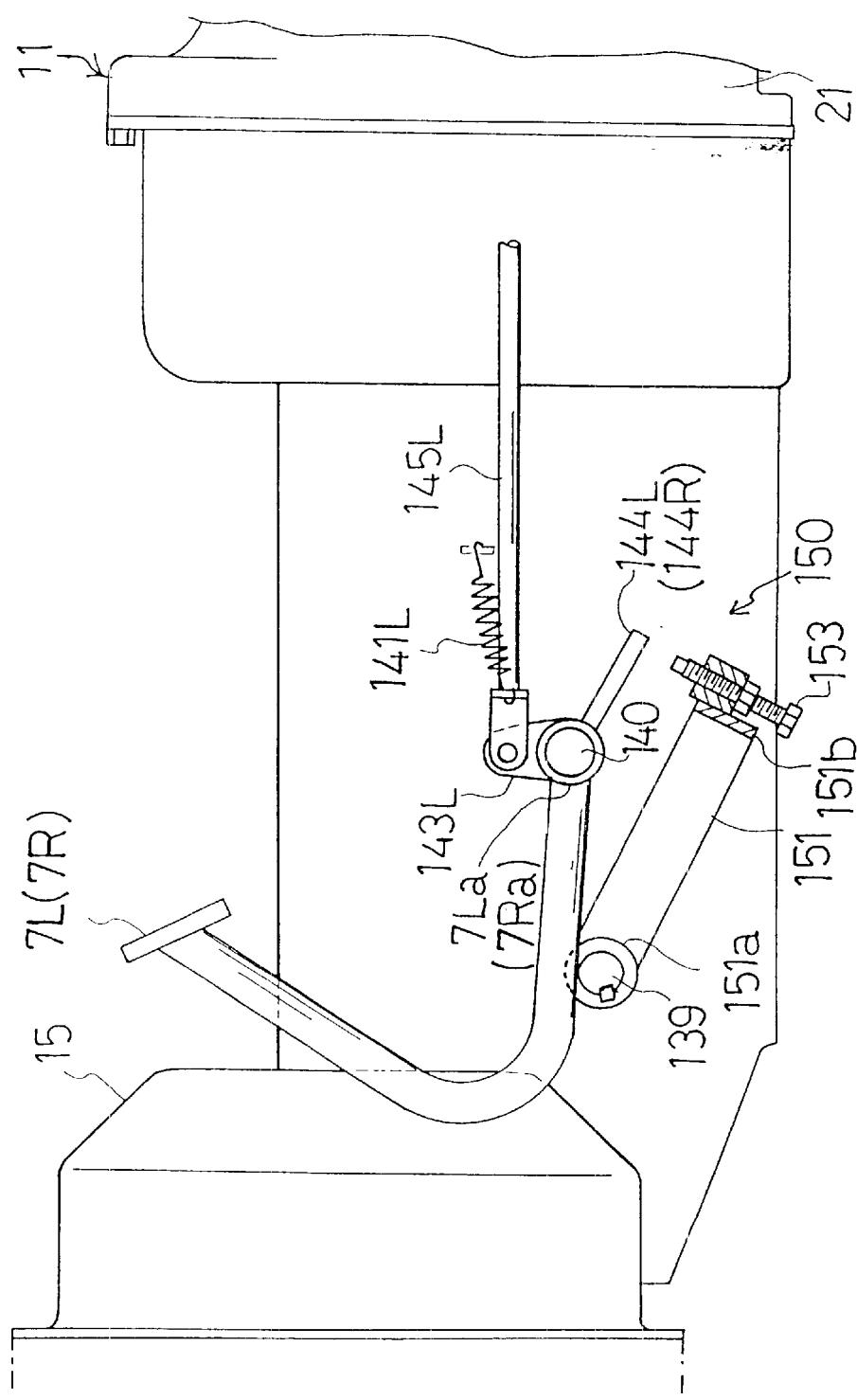
FIG. 27 is a left side plan view of the vehicle body frame.

The cylindrical member 7Ra positioned inside the cylindrical member 7La is non-relatively rotatably coupled with second brake pedal shaft 140 and only an abutting segment 144R projects from the outer periphery of the cylindrical member 7Ra. The abutting segments 144L and 144R project rearwardly and downwardly at a slant and allow both the abutting surfaces to be positioned in the same plane. A cylindrical member 7Rb is non-relatively rotatably coupled with the right hand end of the second brake pedal shaft 140. An arm 143R projects from the cylindrical member 7Rb, and a link 145R is connected at one end thereof with the arm 143R and at the other end with a brake arm 152R of the running brake unit 137R. Between the arms 143L and 143R and a retaining portion (not shown) at the lower surface of left and right steps are stretched tension springs 141L and 141R. The tension springs 141L and 141R bias the brake arms 152L and 152R of the brake units 137L and 137R in the direction of brake releasing. When either the left hand turn brake pedal 7L or the right hand turn brake pedal 7R—in the not-treading state in FIG. 27—is trod the respective cylinder members 7La and 7Ra rotate to counterclockwise swing the arms 143L and 143R, so that the links 145l and 145R are pulled forward. As a result, the tension springs 141L and 141R expand and the left and right running brake units 137L and 137R are engaged independently through the brake arms 152L and 152R. Therefore, the rear wheels 27L and 27R can be braked independently to assist the vehicle in running.

Figure 25:
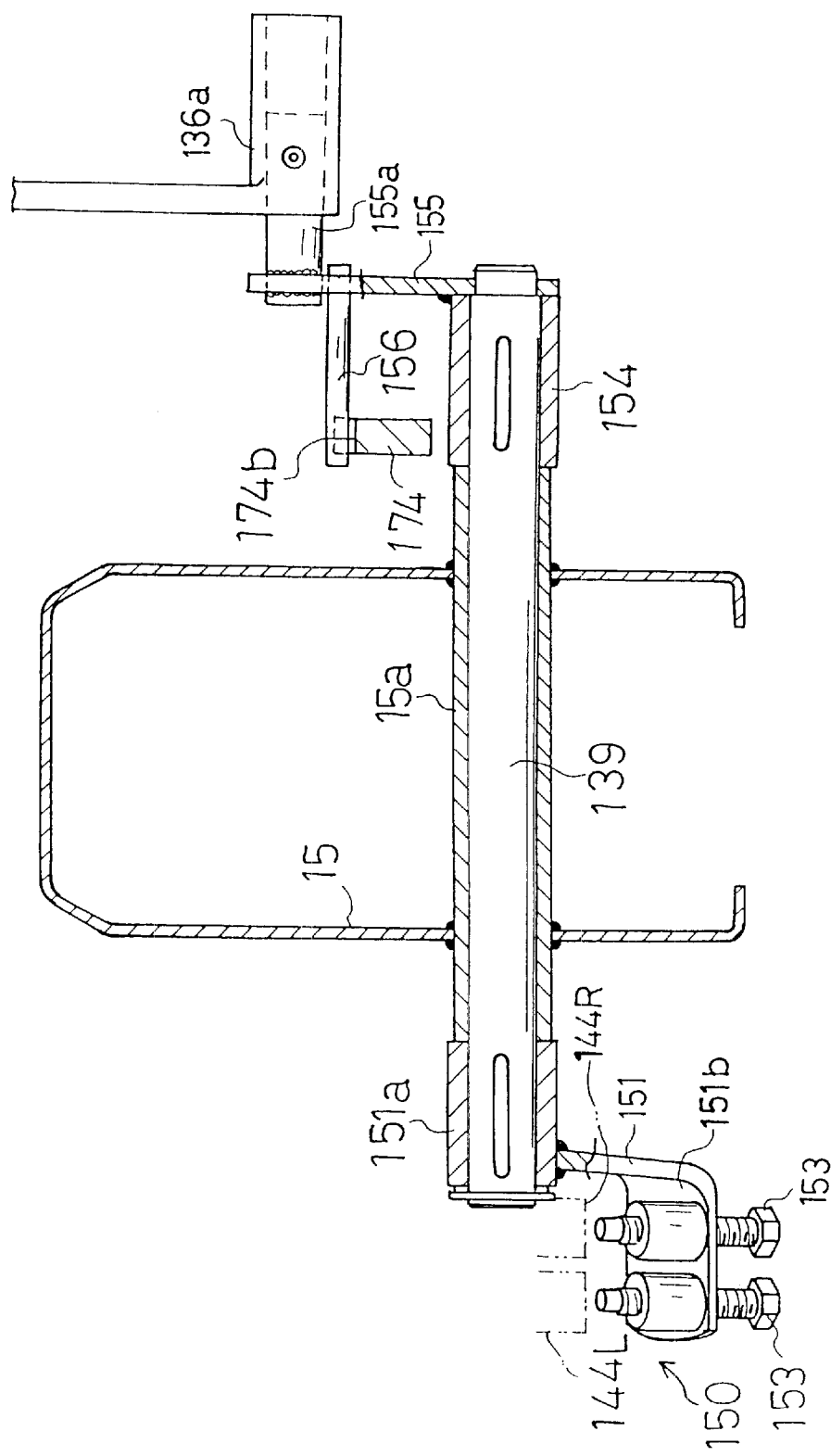
FIG. 25 is a cross-sectional view of the vehicle body supporting a first brake pedal shaft.
Figure 26:
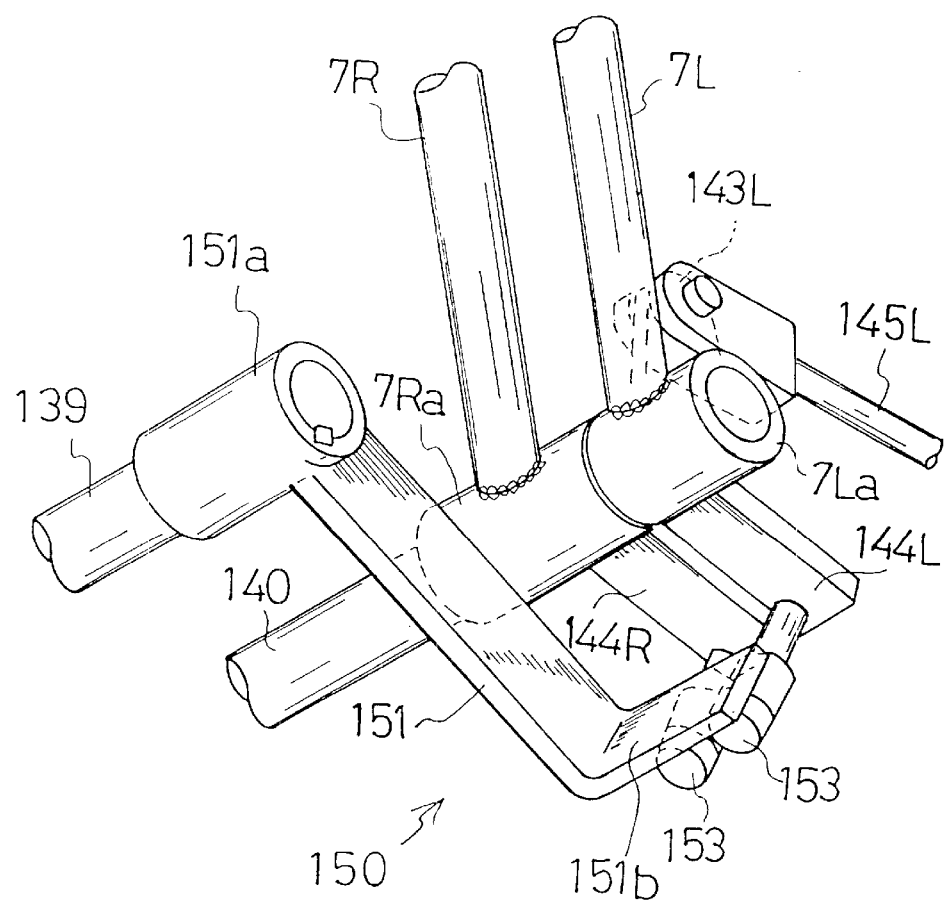
FIG. 26 is a perspective view of a simultaneous brake operating mechanism with respect to left and right turn brake pedals.

As shown in FIG. 25, at the left end of the first brake pedal shaft 139 a simultaneous brake operating mechanism 150 is provided, which operates the left hand turn brake pedal 7L and right hand turn brake pedal 7R simultaneously so as to simultaneously actuate the left and right hand rear axles 27L ans 27R. Namely, a cylindrical member 151a is not relatively rotatably coupled with the left end of the first brake pedal shaft 139 and an abutting arm 151, substantially L-like-shaped when viewed in plan, is fixed to the cylindrical member 151a. The abutting arm 151 is horizontally bent at the utmost end thereof to form a leg 151b across the abutting segments 144L and 144R. On the leg 151b are adjusting bolts 153, which are optionally adjustable to fill a gap between the tip of each adjusting bolt 153 and the lower surface of the abutting segment 144L or 144R.

Figure 28:
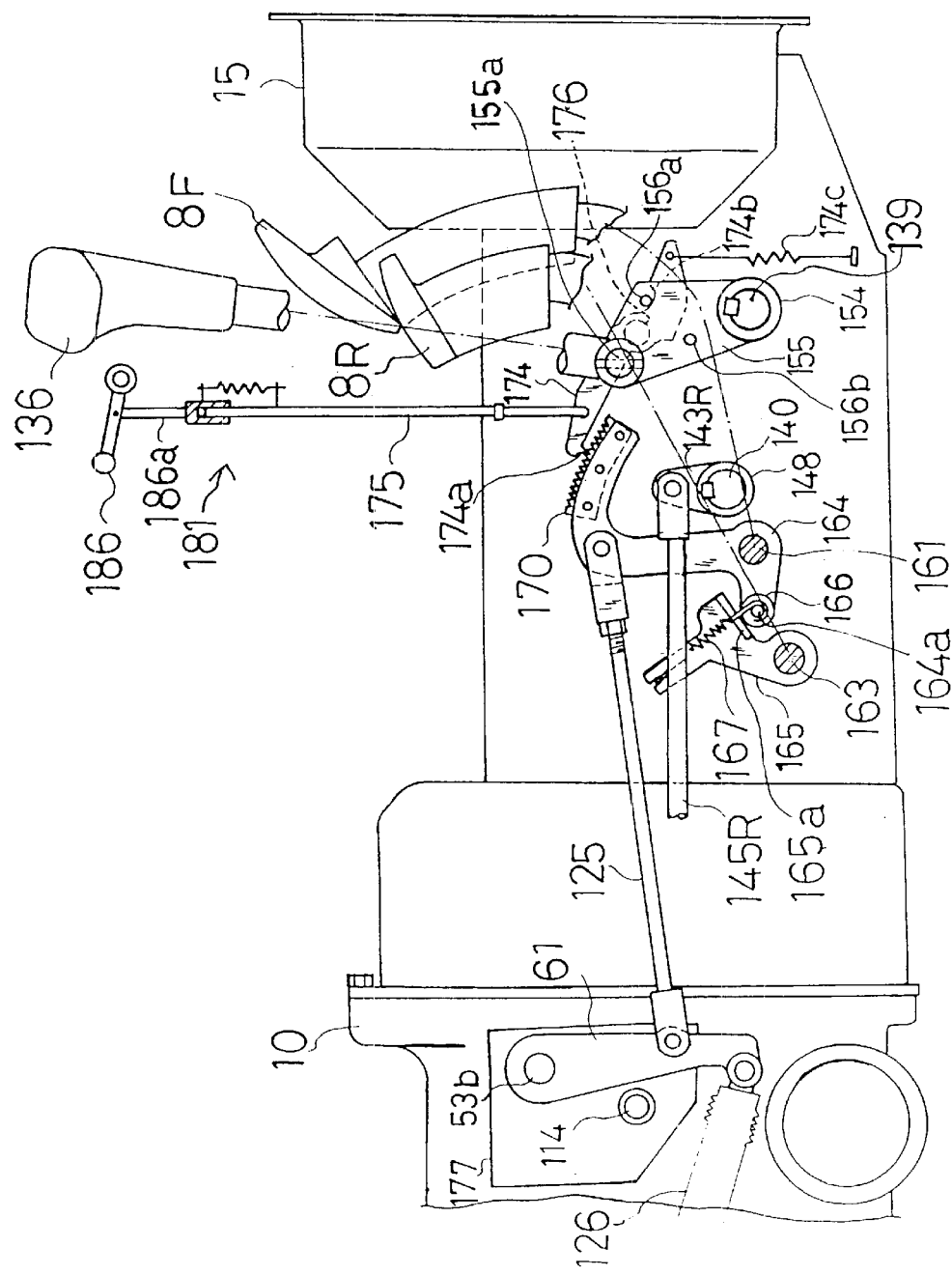
FIG. 28 is a right side plan view of the same.

Meanwhile, as shown in FIG. 25, the right end of the first brake pedal shaft 139 is non-relatively rotatably coupled with a cylindrical member 154. In the cylindrical member 154 is mounted a bracket 155. From the outside surface of the bracket 55 projects a pin 155a, which extends parallel to the first brake pedal shaft 139. A cylindrical member 136a, which is fixed to the base of master brake pedal 136, is sleeved and connected onto the pin 155a. Accordingly, when the master brake pedal 136 shown in FIG. 28 is trod, the first brake pedal shaft 139 rotates counterclockwise through the mounting bracket 155. In turn the abutting arm 151 rotates counterclockwise, when viewed in FIG. 28, and the adjusting bolts 153 push the lower surface of the abutting segments 144L and 144R respectively to allow the cylindrical members 7La and 7Ra to rotate counterclockwise. Consequently, the left and right turn brake pedals 7L and 7R are simultaneously manipulated so as to simultaneously actuate the left and right running brake units 137L and 137R, thereby stopping the vehicle.

The first brake pedal shaft 139, and the second brake pedal shaft 140 extend laterally of the vehicle body 15 and are positioned longitudinally thereof. At one lateral end of the second brake pedal shaft 140, are rotatably supported the turn brake pedals 7L and 7R in a juxtaposed fashion for independently desirably operating the left and right running brake units 137L and 137R which independently brake the left and right axles. At the opposite lateral end of the first brake pedal shaft 139 is disposed the master brake pedal 136 and at the one lateral end of the same is disposed a simultaneous brake operating mechanism with respect to the turn brake pedals 7L and 7R. Thus, the shaft for supporting the left and right turn brake pedals 7L and 7R and that for supporting the master brake 136 are separate from each other and have no interrelationship. Consequently, when the vehicle body turns or stops, the desired left and right brake units can stably and reliably be operated.

The simultaneous brake operating mechanism for the left an right turn brake pedals 7L and 7R, is constructed so that the abutting arm 151, which has the leg 151b enabling it to simultaneously abut against the abutting segments 144L and 144R provided at the rotary bases of the turn brake peals 7L and 7R, is fixed to one end of the first brake pedal 139 for supporting the master brake pedal 136. Thus, the mechanism for simultaneously actuating the left and right running brake units is simple in construction, low in manufacturing cost and simple in assembly.

At the portion of the abutting arm 151 opposite to the abutting segments 144L and 144R is provided a mechanism for adjusting the timing of abutting arm 151 against the abutting segments, whereby, even when an error is made during assembly, the error can easily be adjusted after assembly so as to enable the timing to be easily adjusted and corrected, thereby reducing the proportion of defective products. Also, even when one side running brake unit exerts braking action in advance of the other side, causing wearing or deformation, despite the master brake pedal, the brake units can easily be adjusted and corrected to thereby simplify maintenance thereof.

Figure 29:
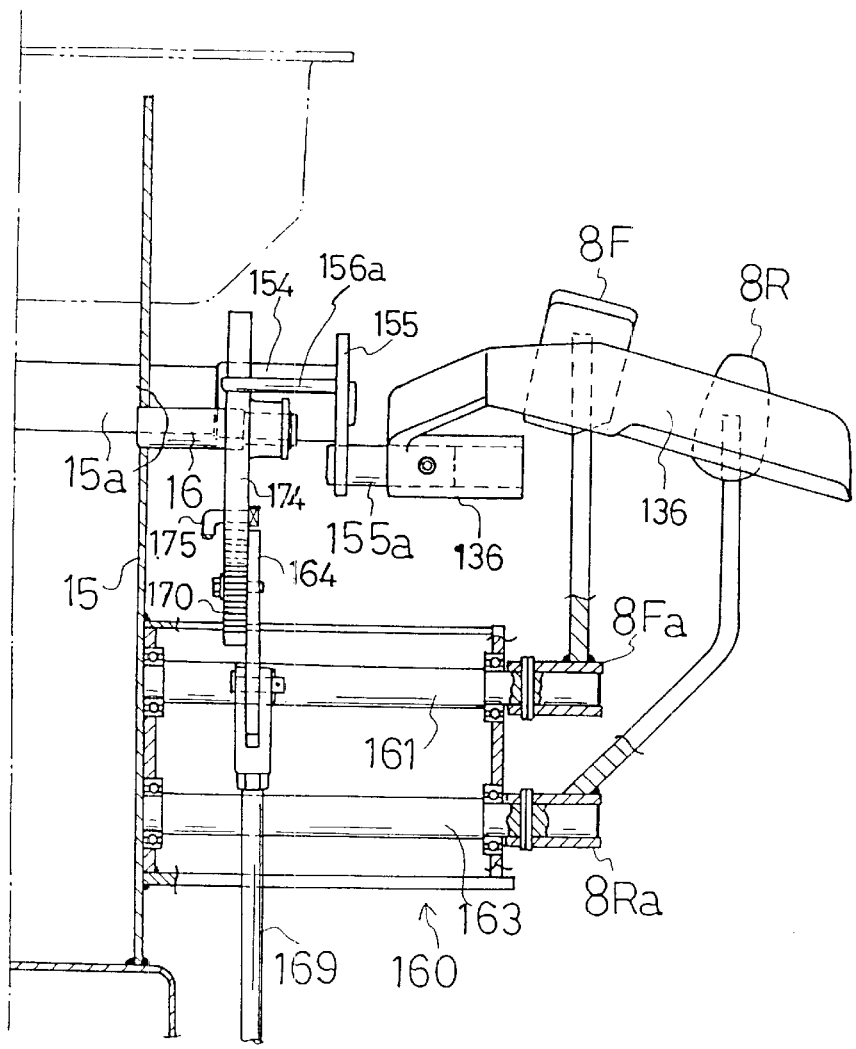
FIG. 29 is a plan view of the right side of the vehicle body frame showing the support for forward and rearward running pedal shafts.

Next, explanation will be given on an operating mechanism for controlling the traveling direction and vehicle speed. As shown in FIG. 29, a frame 160 which is laterally and longitudinally defined by elongate plates is mounted at the right side surface of the vehicle frame 15 and below the right side step 4. A first running pedal shaft 161 and a second running pedal shaft 163 are pivotally supported to the frame 160 longitudinally of the body and in parallel to each other.

Figure 30:
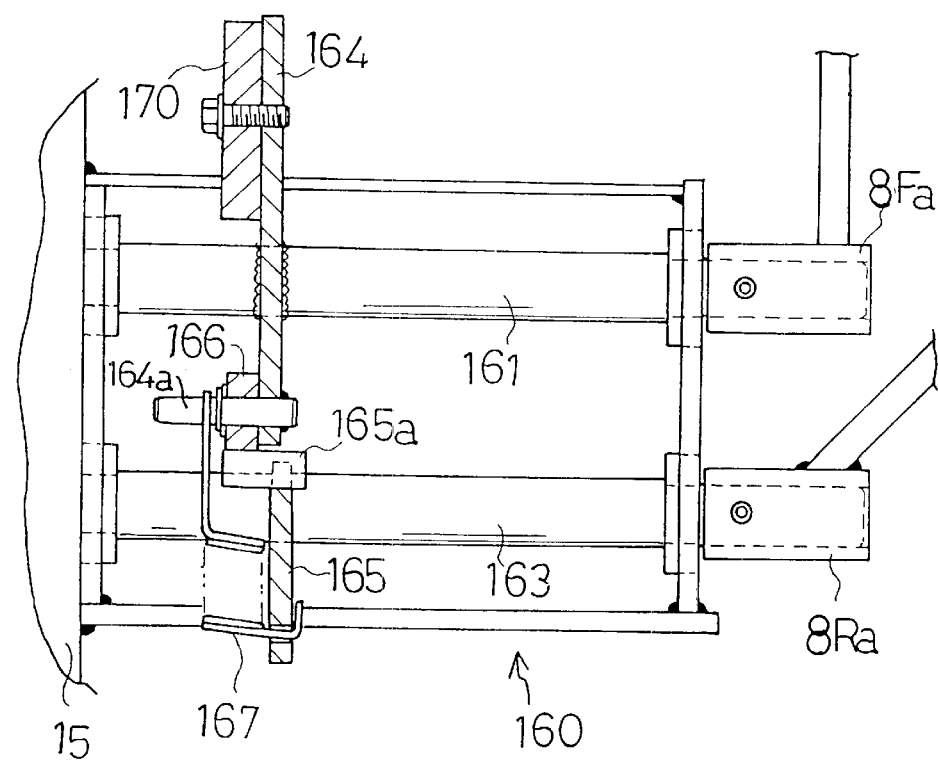
FIG. 30 is a partial cross-sectional plan view showing engagement of the forward and rearward running pedal shafts.

The first running pedal shaft 161 is non-relatively rotatably coupled at one end with a cylindrical member 8Ra to which is fixed the base of the forward running pedal 8F. The second running pedal shaft 163 is non-relatively rotatably coupled at one end thereof with a cylindrical member 8Ra to which is fixed the base of the rearward running pedal 8R. To the first running pedal shaft 161 is fixed an arm 164 having a first leg and a second leg bent in a U-Like shape and is Z-Like-shaped as a whole when viewed from the lateral side (refer to FIG. 28). A roller 166 is rotatably supported to a pivot pin 164a, which is provided at the first leg of the arm 164 (refer to FIG. 30). To the second running pedal shaft 163 is fixed an arm 165 provided with an abutting portion 165a which abuts the roller 166. A spring 167 is stretched between the arm 165 and the pivot pin 164a so as to bias the abutting portion 165a of the arm 165 to permanently abut against the roller 166. A connecting rod 125 is connected at one end thereof to the second leg of the arm 164 so that the arm 164 connect with the speed control arm 61 through the connecting rod 125.

When the forward running pedal 8F shown in FIG. 28 is trod during operation, the arm 164 rotates clockwise around the first running pedal shaft 161, and the connecting rod 125 is pulled forwardly of the vehicle body so that the speed control arm 61 swings forwardly from the neutral position shown so as to increase the forward speed (as described above). Also, when the rearward running pedal 8R is trod, the arm 165 swings clockwise around the second running pedal shaft 163. As a result, the abutting portion 165a pushes the arm 164 counterclockwise, so that the connecting rod 125 is pushed rearwardly of the vehicle body. Consequently, the speed control arm 61 rearwardly swings from the neutral position shown so as to increase the speed of rearward movement of the vehicle (as described above). In addition, when the operator's foot is released from the rearward running pedal 8R, the speed control arm 61, forward running pedal 8F and rearward running pedal 8R are subjected to the action of the neutral position biasing spring 59 housed in the front casing 10 and hydraulic reaction of the hydraulic pump housed in the same so as to automatically return to the neutral position shown in FIG. 28. In addition, as shown in FIGS. 28, and 18 through 20, a shock absorber 126 is mounted to the speed control arm 61 to thereby apply resistance thereto when returning to the neutral position.

Next, explanation will be given on a locking mechanism which can fix the forward running pedal 8F in an optional forward movement operating position. In FIG. 28, the second leg of the arm 164 is forwardly bent at the utmost end. A ratchet 170 is mounted to the upper portion of the second leg of the arm 164. On the upper surface of the ratchet 170 are a number of teeth, formed in a row longitudinally of the vehicle. From the outside surface of the body frame 15, in front of the ratchet 170, projects a spindle 176, to which a locking arm 174 is pivotally supported at about the central portion. A pawl 174a is formed at the lower side of the utmost end of the locking arm 174 and disposed above the ratchet 170 so that the pawl 174a can engage with the ratchet 170.

Figure 31:
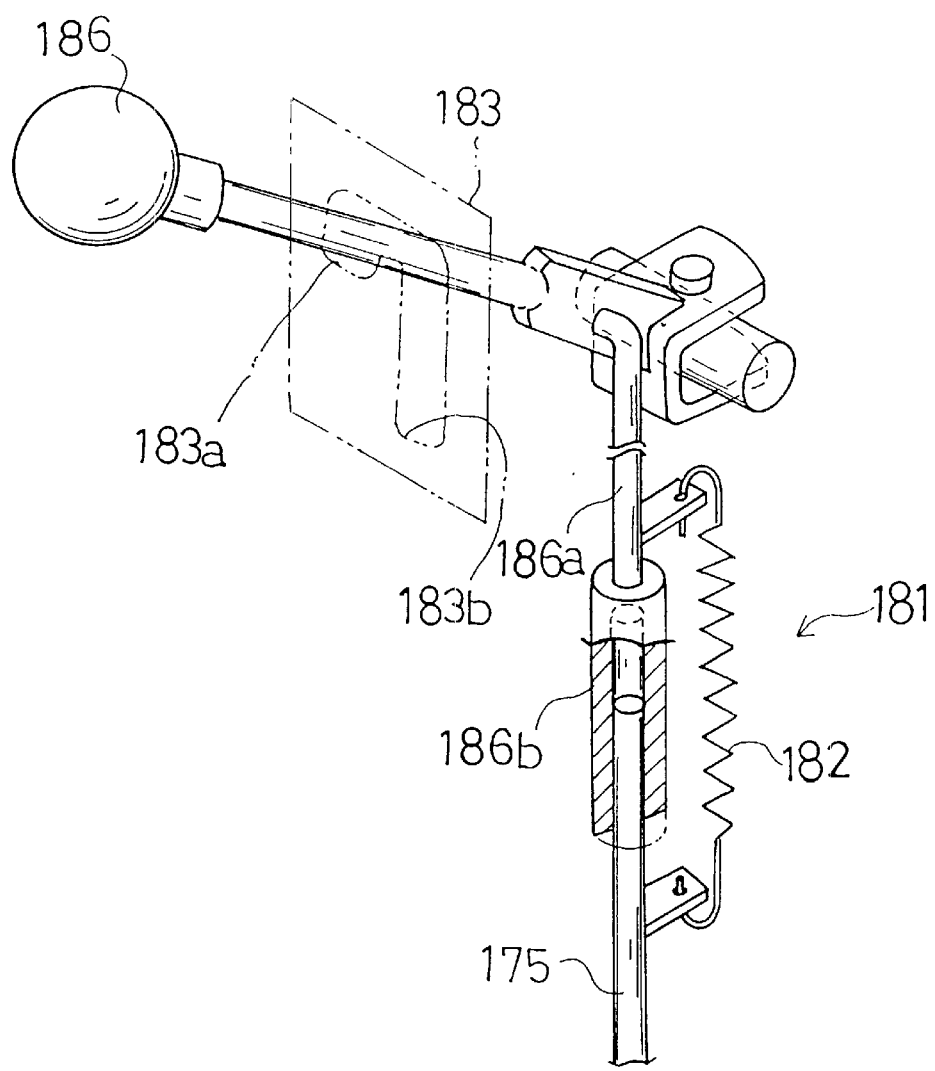
FIG. 31 is a perspective view of a cruise control lever and a lost-motion mechanism.

A link 175, which is connected to one end of the locking arm 174, is connected through a lost-motion mechanism 181 to a cruise control lever 186 disposed at the rear surface of the dash board 2. The lost-motion mechanism 181, as shown in FIG. 31, is constructed so that a cylindrical member 186b is fixed to the lower end of the link 186a, which connects with the cruise control lever 186. The link 175 is axially slidably inserted at its upper end into the cylindrical member 186b, and a tension spring 182 is stretched between the link 186a and the link 175 so as to generate a biasing force only in the direction of moving the links 186a and 175 toward each other.

Again referring to FIG. 28, a recessed abutting portion 174b is formed on the upper surface of the other end of the locking arm 174. On the mounting bracket 155, which as described above supports the master brake pedal 136, are erected a lock releasing pin 156a and stopper pin 156b, which project toward the locking arm 174. The lock release pin 156a is positioned above the abutting portion 174b. A tension spring 174c is stretched between the utmost end of the forward portion of locking arm 174 and the retaining portion provided on the outside surface of the body frame 15 so as to bias the locking arm 174 to lift the pawl 174a at the one end thereof away from the ratchet 170 and to abut at the other end against the stopper pin 156b.

As shown in FIG. 31, a lever guide 183 is attached to the rear surface of the dash board 2. The lever guide 183 has a hooked guide groove continuously connecting a vertical short lock releasing groove 183a and a vertical long locking groove 183b through a horizontal groove. When the cruise control lever 186 is held in the lock releasing groove 183a, the link 175 is pulled upward through the lost-motion mechanism 181 so that the locking arm 174 rotates clockwise (when viewed in FIG. 28) around the spindle 176 to disengage the pawl 174a from the ratchet 170. Hence, the forward running pedal 8F or the rearward running pedal 8R can freely be trod, so that the speed of the HST may enable forward movement or change the vehicle speed. In addition, when the cruise control lever 186 is put at the lock releasing portion 183a, rotation of the locking arm 174 is regulated by the stopper pin 156b, whereby the tension spring 182 of the lost-motion mechanism 181 is stretched to generate a biasing force.

When the operator shifts the cruise control lever 186 to the locking groove 183b of the lever guide 183, the biasing force following the restoration of tension spring 182 automatically moves the cruise control lever 186 downwardly to substantially the central position of the locking groove 183b. In addition, the link 186a abuts against the link 175. Thus, the operator further downwardly pushes the cruise control lever 186, whereby the force thereof, as shown in FIG. 28, is transmitted from the utmost end of the link 186a to the locking arm 174 through the link 175 so as to rotate the locking arm 174 counterclockwise around the spindle 176, whereby the pawl 174a engages with the predetermined tooth of the ratchet 170. Because the arm 164 is subjected to a counterclockwise force around the first running pedal shaft 161 by the aforesaid neutral braking spring 59 and the hydraulic reaction of the hydraulic pump P1, a predetermined frictional holding force is generated at the engaging portion of the pawl 174a with the teeth of ratchet 170 according to the form setting of both the members. Therefore, even when the operator releases his hand from the cruise control lever 186, the engaging state of pawl 174a is maintained. Thus, the forward running pedal 8F is fixed in the predetermined forward movement operating position so that, even when the operator removes his foot from the forward running pedal 8F, the HST is continuously driven to keep the vehicle at a constant speed.

When the master brake pedal 136 is trod to operate the left and right brake units 137L and 137R for halting the vehicle, the lock releasing pin 156a, which projects from the mounting bracket 155, shifts clockwise around the first brake pedal shaft 139 in FIG. 28 and abuts against the abutting portion 174b of the locking arm 174. The locking arm 174 is then subjected to the forces of lock releasing pin 156a and tension spring 174c so as to be rotated clockwise around the spindle 176, whereby the pedal 174a is forcibly disengaged from the teeth of the ratchet 170. Hence, the forward running pedal 8F is unlocked and the speed control arm 61 for the HST and the forward running pedal 8F are subjected to the force of neutral biasing spring 59 and the hydraulic reaction of the hydraulic pump P1 so as to return to the central positions, thereby stopping the vehicle without stopping the engine E. When the locking arm 74 is rotated clockwise, the link 175 together with the link 186a is upwardly pushed and cruise control lever 186 is pushed upwardly to substantially the neutral position of the locking groove 183b of the lever guide 183. Hence, when the vehicle again travels forwardly, the operator treads the forward running pedal 8F until a predetermined vehicle speed is obtained and the cruise control lever 186 is once more pushed down to the lower end of the locking groove 183b of the lever guide 183, thereby enabling a constant vehicle speed to again be maintained.

Thus, the shaft for supporting the left and right turn brake pedals 7L and 7B and that for supporting the master brake pedal 136 are separately disposed. Moreover, the lock releasing mechanism for enabling the running pedals 8L and 8R to be fixed at a set forward speed is provided in the vicinity of the master brake pedal 136 so that the master brake pedal can act to release the mechanism. Thus, the master brake pedal 136, when laid out, is easy to design without any limitation, thereby enabling the master brake pedal 136 to be laid out in an optimum position for operability.

While a preferred embodiment of the invention has been described using specific terms, such description is for illustrative purpose only, and it is to be understood that changes and variations may be made without departing from the spirit of the invention, as defined in the following claims.

What is claimed is:

1. A transmission for a vehicle comprising:

a housing;

a partition wall dividing said housing into a first chamber and a second chamber;

a hydrostatic transmission which transmits power from an engine to drive wheels;

a power take-off transmission shaft disposed in said second chamber of said housing to which power is taken from said hydrostatic transmission;

a power take-off shaft disposed in said second chamber of said housing to which power is transmitted from said power take-off transmission shaft;

a power take-off brake mounted onto said partition wall in said first chamber of said housing which brakes said power take-off shaft;

a power take-off clutch provided on said power take-off transmission shaft, which when disconnected, engages said power take-off brake;

a cylinder chamber recessed into a surface of said partition wall;

a friction brake provided with a frictional braking member including rotary plates housed in said cylinder chamber and integrally rotatable with said power take-off transmission shift, and fixed plates retained to said cylinder chamber, wherein both said rotary plates and said fixed plates are provided in alternating layers;

a pressure plate disposed at a lateral side of said frictional braking member;

a cover mounted on a surface of said partition wall covering said pressure plate;

a spring disposed in said cover for biasing said pressure plate in the direction of said frictional braking member;

a rotary joint formed between said power take-off transmission shaft and said partition wall for supplying and discharging operating oil to and from said power take-off clutch;

a biasing portion of said pressure plate projecting towards said frictional braking member;

an annular piston portion of said pressure plate projecting radially from an outer periphery of said biasing portion;

an annular recessed cylinder chamber formed on an outer periphery of said partition wall into which said annular piston portion of said pressure plate is slidably fitted;

an oil passage formed in said partition wall;

a directional control valve for guiding oil to said rotary joint and to said annular recessed cylinder chamber through said oil passage formed in said partition;

a side plate mounted on an outer surface of a side wall of said housing on which said directional control valve is disposed;

a second oil passage provided between said side plate and said housing which communicates with a clutch port of said directional control valve, and an accumulator connected to said second oil passage extending to said rotary joint from said oil passage, wherein a casing for said accumulator is constructed as a part of said housing.

2. A transmission for a vehicle as set forth in claim 1, wherein said accumulator comprises:

a piston slidably housed in a bore bored on the outer surface of said side wall of said housing and into said partition wall, wherein said bore is closed by said side plate, and an oil passage is disposed between said side plate and said piston.

* * * * *